(12) United States Patent
Furusawa et al.

(10) Patent No.: US 10,144,110 B2
(45) Date of Patent: Dec. 4, 2018

(54) WORK TOOL

(71) Applicant: MAKITA CORPORATION, Anjo-Shi (JP)

(72) Inventors: Masanori Furusawa, Anjo (JP); Ken Yamauchi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 98 days.

(21) Appl. No.: 15/351,659

(22) Filed: Nov. 15, 2016

(65) Prior Publication Data

US 2017/0080545 A1  Mar. 23, 2017

Related U.S. Application Data

(63) Continuation of application No. 14/376,416, filed as application No. PCT/JP2013/051797 on Jan. 28, 2013, now Pat. No. 9,545,699.

(30) Foreign Application Priority Data

Mar. 2, 2012  (JP) ................................ 2012-022175

(51) Int. Cl.
*B24B 45/00* (2006.01)
*B24B 23/04* (2006.01)
(Continued)

(52) U.S. Cl.
CPC ............ *B24B 45/006* (2013.01); *B23B 31/10* (2013.01); *B23Q 3/12* (2013.01); *B24B 23/04* (2013.01);
(Continued)

(58) Field of Classification Search
CPC ..... B24B 45/006; B24B 23/04; B27B 19/006; B27B 5/32; B25F 3/00; B25F 5/00;
(Continued)

(56) References Cited

U.S. PATENT DOCUMENTS

| 10,924 A | 5/1854 | Daboli |
|---|---|---|
| 32,890 A | 7/1861 | Pollard |
| (Continued) | | |

FOREIGN PATENT DOCUMENTS

| AL | 9623627 A1 | 8/1996 |
|---|---|---|
| CN | 202114710 U | 1/2012 |
| (Continued) | | |

OTHER PUBLICATIONS

Office Action from the German Patent Office dated Oct. 17, 2017 in related German application No. 10 2013 000831.9, and translation thereof.

(Continued)

*Primary Examiner* — Sunil K Singh
*Assistant Examiner* — Paul M Janeski
(74) *Attorney, Agent, or Firm* — J-Tek Law PLLC; Jeffrey D. Tekanic; Scott T. Wakeman

(57) ABSTRACT

A power tool for driving an accessary removably held between first and second clamp parts includes a first shaft having the first clamp part, a second shaft for moving the second clamp part, a holding member movable relative to the second shaft, a moving member for moving the holding member, and a biasing member for biasing the moving member. The second shaft is disposed inside the first shaft. The holding member enables the second clamp part and the first clamp part to hold the tool accessary therebetween in a first position, and disables the second clamp part and the first clamp part from holding the tool accessary in a second position. The moving member moves the holding member from the first position to the second position, and the biasing member biases the moving member when the holding member is located in the second position.

20 Claims, 19 Drawing Sheets

(51) Int. Cl.
*B27B 5/32* (2006.01)
*B25F 5/00* (2006.01)
*B23B 31/10* (2006.01)
*B23Q 3/12* (2006.01)
*B25F 3/00* (2006.01)
*B27B 19/00* (2006.01)
*B23B 31/107* (2006.01)
*B23B 31/40* (2006.01)
*B23B 31/19* (2006.01)

(52) U.S. Cl.
CPC ............... *B25F 3/00* (2013.01); *B25F 5/00* (2013.01); *B27B 5/32* (2013.01); *B27B 19/006* (2013.01); *B23B 31/107* (2013.01); *B23B 31/19* (2013.01); *B23B 31/4073* (2013.01); *Y10T 279/33* (2015.01)

(58) Field of Classification Search
CPC ....... B23B 31/10; B23B 31/107; B23B 31/19; B23B 31/4073; B23Q 3/12; Y10T 279/33
See application file for complete search history.

(56) References Cited

U.S. PATENT DOCUMENTS

| | | | |
|---|---|---|---|
| 78,652 | A | 6/1868 | Craig |
| 890,688 | A | 6/1908 | McBride |
| 3,233,908 | A | 2/1966 | Walter et al. |
| 3,622,170 | A | 11/1971 | Sedgwick |
| 3,998,467 | A | 12/1976 | Petkovich |
| 4,205,572 | A | 6/1980 | Weiner |
| 4,237,659 | A | 12/1980 | Welsch et al. |
| 4,590,900 | A | 5/1986 | Hayashi |
| 4,597,227 | A | 7/1986 | Gentischer et al. |
| 4,747,607 | A | 5/1988 | Emter |
| 4,989,374 | A | 2/1991 | Rudolf et al. |
| 5,031,361 | A | 7/1991 | MacKay |
| 5,157,873 | A | 10/1992 | Rudolf et al. |
| 5,263,283 | A | 11/1993 | Rudolf et al. |
| 5,468,176 | A | 11/1995 | Udert et al. |
| 5,573,255 | A | 11/1996 | Salpaka |
| 5,575,071 | A | 11/1996 | Phillips et al. |
| 5,601,483 | A | 2/1997 | Rudolf et al. |
| 5,946,810 | A | 9/1999 | Hoelderlin et al. |
| 6,142,858 | A | 11/2000 | Luedeke |
| 6,569,001 | B2 | 5/2003 | Rudolf et al. |
| 6,612,039 | B2 | 9/2003 | Kakiuchi et al. |
| 6,623,202 | B2 | 9/2003 | Hansson et al. |
| 6,735,876 | B2 | 5/2004 | Hirabayashi |
| 6,796,888 | B2 | 9/2004 | Jasch |
| 6,860,792 | B2 | 3/2005 | Krondorfer et al. |
| 6,887,142 | B2 | 5/2005 | Rupprecht et al. |
| 6,910,694 | B2 | 6/2005 | Hartmann et al. |
| 7,344,435 | B2 | 3/2008 | Pollak et al. |
| 7,789,737 | B2 | 9/2010 | Liersch |
| 7,997,586 | B2 | 8/2011 | Ziegler et al. |
| 8,042,437 | B2 | 10/2011 | Maier et al. |
| 8,113,520 | B2 | 2/2012 | Zaiser et al. |
| 8,181,973 | B2 | 5/2012 | Dezheng et al. |
| 8,182,316 | B2 | 5/2012 | Peisert |
| 8,187,058 | B2 | 5/2012 | Blickle et al. |
| 8,272,135 | B2 | 9/2012 | Zhou |
| 8,317,574 | B2 | 11/2012 | Blickle et al. |
| 8,641,049 | B2 | 2/2014 | Marini et al. |
| 9,108,255 | B2 | 8/2015 | Li |
| 9,120,216 | B2 | 9/2015 | Zhang et al. |
| 9,555,554 | B2 | 1/2017 | Thorson et al. |
| 9,737,969 | B2 | 8/2017 | Bek et al. |
| 2002/0035882 | A1 | 3/2002 | Hartmann |
| 2002/0070037 | A1 | 6/2002 | Jasch |
| 2002/0170408 | A1 | 11/2002 | Hartmann et al. |
| 2003/0100251 | A1 | 5/2003 | Besch |
| 2005/0095966 | A1 | 5/2005 | Jasch et al. |
| 2005/0156390 | A1 | 7/2005 | Marini et al. |
| 2006/0172669 | A1 | 8/2006 | Hesse et al. |
| 2007/0060030 | A1 | 3/2007 | Pollak et al. |
| 2007/0082590 | A1 | 4/2007 | Kraenzler et al. |
| 2007/0295156 | A1 | 12/2007 | Ziegler et al. |
| 2009/0023371 | A1 | 1/2009 | Blickle et al. |
| 2009/0273146 | A1 | 11/2009 | Dezheng et al. |
| 2010/0197208 | A1 | 8/2010 | Blickle et al. |
| 2010/0236806 | A1 | 9/2010 | Heilig et al. |
| 2011/0074122 | A1 | 3/2011 | Marini et al. |
| 2011/0086582 | A1 | 4/2011 | Takemura et al. |
| 2011/0260414 | A1 | 10/2011 | Ota et al. |
| 2011/0316241 | A1 | 12/2011 | Zhang et al. |
| 2012/0067607 | A1 | 3/2012 | Weber et al. |
| 2012/0139196 | A1 | 6/2012 | Zhou |
| 2012/0169018 | A1 | 7/2012 | Lu et al. |
| 2013/0047762 | A1 | 2/2013 | Hecht et al. |
| 2013/0193653 | A1 | 8/2013 | Marini et al. |
| 2014/0084552 | A1 | 3/2014 | Zieger et al. |
| 2014/0191481 | A1 | 7/2014 | Kawakami et al. |
| 2014/0290072 | A1 | 10/2014 | Brown |
| 2016/0184956 | A1 | 6/2016 | Klabunde et al. |
| 2016/0199919 | A1 | 7/2016 | Klabunde et al. |
| 2016/0288288 | A1 | 10/2016 | Klabunde et al. |

FOREIGN PATENT DOCUMENTS

| | | |
|---|---|---|
| DE | 3741484 C1 | 8/1989 |
| DE | 29605728 U1 | 9/1996 |
| DE | 10030586 A1 | 1/2002 |
| DE | 102004020982 A1 | 11/2005 |
| DE | 102005047400 B3 | 12/2006 |
| DE | 102005031802 A1 | 1/2007 |
| DE | 602005003595 T2 | 11/2008 |
| DE | 102007035045 A1 | 1/2009 |
| DE | 202011050511 U1 | 11/2011 |
| DE | 202011050937 U1 | 11/2011 |
| DE | 102011005021 A1 | 9/2012 |
| DE | 102011005818 A1 | 9/2012 |
| DE | 102011085561 A1 | 12/2012 |
| EP | 0577579 A1 | 1/1994 |
| EP | 0596831 A1 | 5/1994 |
| EP | 1852218 A1 | 11/2007 |
| EP | 1790434 B1 | 3/2008 |
| EP | 1852218 B1 | 6/2010 |
| WO | 2005049275 A1 | 6/2005 |
| WO | 2005102605 A | 11/2005 |
| WO | 2012007203 A1 | 1/2012 |
| WO | 2015014469 A | 2/2015 |

OTHER PUBLICATIONS

English translation of International Preliminary Report on Patentability for parent application No. PCT/JP2013/051797.
English translation of International Search Report for parent application No. PCT/JP2013/051797.

WORK TOOL

CROSS-REFERENCE

This application is a continuation of U.S. patent application Ser. No. 14/376,416 filed on Aug. 1, 2014, which is the U.S. National Stage of International Application No. PCT/JP2013/051797 filed on Jan. 28, 2013, which claims priority to Japanese patent application No. 2012-022175 filed on Feb. 3, 2012.

TECHNICAL FIELD

The present invention relates to a power tool which drives a tool accessory.

BACKGROUND ART

WO2005/102605 discloses a power tool which drives a tool accessory held by a work spindle and a fastening element. In this power tool, the fastening element can slide with respect to the work spindle between a clamped position in which the tool accessory is held and an open position in which the tool accessory is removed from the work spindle. In the clamped position, a retaining assembly provided inside the work spindle clamps a clamp shaft of the fastening element. Specifically, the retaining assembly provided inside the work spindle holds the fastening element using a clamping force which is applied by a spring element provided inside the work spindle. The tool accessory is held in this manner between the work spindle and the clamping element. When a cock lever is operated, this retaining assembly unclamps the clamping element through axial displacement of a thrust member.

SUMMARY OF THE INVENTION

In the power tool described in WO2005/102605, however, in order to clamp the clamp shaft of the fastening element using the retaining assembly, it is necessary for the user to hold the fastening element in a predetermined position, while operating the cock lever in the state that the retaining assembly does not hold the clamping element. Specifically, the user needs to simultaneously operate the cock lever and hold the position of the fastening element. Therefore, the attaching operation is troublesome for the user who needs to perform the operations at one time.

Accordingly, it is an object of the present invention to provide a technique of holding a tool accessory in a power tool by a simple operation.

In order to solve the above-described problem, according to a preferred aspect of the present invention, a power tool is provided which drives a tool accessory removably held between a first clamp part and a second clamp part. The power tool includes a first shaft having the first clamp part, a second shaft having the second clamp part, a holding member which fixedly holds the second shaft with respect to the first shaft, a moving member which moves the holding member, and a first biasing member which biases the moving member. The first and second shafts are disposed such that their axes extend in parallel to each other, and the second shaft is disposed inside the first shaft. The holding member is configured to move between a first position in which the holding member is capable of holding the second shaft and a second position in which the holding member is incapable of holding the second shaft. Further, the moving member is configured to move the holding member from the first position to the second position. When the holding member is located in the second position, the first biasing member is configured to bias the moving member and thereby prevent movement of the moving member.

According to this preferred aspect of the present invention, because the first biasing member is configured to bias the moving member and thereby prevent movement of the moving member when the holding member is located in the second position, it is not necessary for the user to hold the holding member in the second position when mounting (inserting) the second shaft in the first shaft. Specifically, the second shaft can be mounted by performing a relatively simple operation. Thus, the tool accessory can be held or clamped without requiring a complicated procedure to be performed by the user.

According to a further aspect of the power tool of the present invention, one end of the first biasing member is connected to the moving member. Further, the moving member is disposed so as to be rotatable and applies torque to the first biasing member by rotating. Typically, the other end of the first biasing member is connected to an element other than the moving member.

According to this aspect, with the structure in which torque is applied to the first biasing member by rotation of the moving member, the first biasing member can prevent the moving member from moving by cooperation between the axial biasing force and torque of the first biasing member.

According to a further aspect of the power tool of the present invention, the moving member is disposed so as to be rotatable with respect to the first shaft. An engagement projection is provided on one of the moving member and the first shaft, and an engagement recess that engages with the engagement projection is provided in the other of the moving member and the first shaft. The engagement recess has a first recess which extends in a circumferential direction of a rotation axis of the moving member, and a second recess which extends in a direction parallel to the rotation axis. The engagement projection engages with the second recess and thereby prevents the moving member from rotating with respect to the first shaft.

According to this aspect, the engagement projection prevents the moving member from moving by engagement with the second recess. Therefore, torque is generated in the first biasing member by movement of the engagement projection relative to the first recess. By engagement of the engagement projection with the second recess, the first biasing member can reliably prevent the moving member from moving by cooperation between the axial biasing force of the first biasing member and the above-described torque.

According to a further aspect of the power tool of the present invention, the second shaft has the second clamp part on one end in a longitudinal direction of the second shaft and a projection protruding in a direction crossing the longitudinal direction on the other end. The holding member is configured to hold the second shaft by contact with the projection.

According to this aspect, with the structure in which the holding member holds the second shaft by contact with the projection, the holding member can more reliably hold the second shaft as compared with a structure in which the holding member clamps the second shaft in a radial direction of the second shaft.

According to a further aspect of the power tool of the present invention, the holding member is disposed inside the first shaft, and a retreat part to which the holding member can retreat is formed in an inner wall of the first shaft. The position of the holding member that has retreated to the retreat part is defined as the second position. Further, when located in the retreat part, the holding member is configured to be incapable of holding the second shaft.

According to this aspect, with the structure in which the retreat part is formed in the inner wall of the first shaft, the holding member for holding the second shaft can move to the retreat part when the second shaft slides along the inner wall of the first shaft. Therefore, it is not necessary to provide an additional structure specially designed for moving the holding member.

According to a further aspect of the present invention, the power tool has an elastic member which is disposed on an outer periphery of the second shaft in the circumferential direction. The elastic member is held into contact with an inner wall of the first shaft. Further, a frictional force is generated between the elastic member and the inner wall of the first shaft.

According to this aspect, with the structure in which a frictional force is generated by contact between the elastic member disposed on the outer periphery of the second shaft and the inner wall of the first shaft, the elastic member can generate a sliding resistance when the second shaft slides within the first shaft. Thus, the second shaft can be prevented from coming off the first shaft.

According to a further aspect of the power tool of the present invention, the moving member includes a locking member that is biased by the first biasing member. The first biasing member is disposed so as to apply a biasing force in the radial direction of the first shaft. When the locking member is biased by the first biasing member and comes into contact with the first shaft, the moving member is prevented from moving in the longitudinal direction of the first shaft.

According to this aspect, when the locking member comes into contact with the first shaft, the locking member biased by the first biasing member prevents the moving member itself from moving. Therefore, the moving member can be reliably prevented from moving.

According to a further aspect of the present invention, the power tool has a second biasing member which biases the holding member. The holding member is biased by the second biasing member and thereby holds the second shaft.

According to this aspect, with the structure in which the holding member is biased by the second biasing member and holds the second shaft, the biasing force of the second biasing member can be utilized to hold the second shaft. Therefore, the second shaft can be reliably held.

According to a further aspect of the power tool of the present invention, the second biasing member is disposed outside the first shaft.

According to this aspect, with the structure in which the second biasing member is disposed outside the first shaft, the first shaft can be made thinner compared with a structure in which the second biasing member is disposed inside the first shaft. Therefore, the first shaft can be reduced in weight and thus the power tool can be reduced in weight. Further, by thinning the first shaft, a driving mechanism for driving the first shaft can be reduced in size, so that the power tool can be reduced in size.

According to a further aspect of the power tool of the present invention, when the holding member is located in the second position and the second shaft is moved in the longitudinal direction of the first shaft, the second shaft is configured to move the moving member against the biasing force of the first biasing member. Further, the holding member is configured to move from the second position to the first position as the moving member is moved by the movement of the second shaft in the longitudinal direction, and to hold the second shaft.

According to this aspect, when mounting the second shaft in the first shaft, the second shaft can be held by the user's operation of moving the second shaft in the longitudinal direction of the first shaft. Specifically, the second shaft can be held by a simple operation, and thereby the tool accessory can be held.

According to a further aspect of the present invention, the power tool has an operating member which moves the moving member, and a third biasing member which biases the operating member. When moving from an initial position corresponding to the first position, the operating member is configured to move the moving member such that the holding member moves from the first position to the second position. Further, when the holding member is located in the second position and the moving member is prevented from moving, the third biasing member is configured to bias the operating member in a direction toward the initial position.

According to this aspect, with the structure in which the operating member is biased in the direction toward the initial position by the biasing force of the third biasing member, the user operates the operating member only when removing the second shaft and does not need to operate the operating member when mounting the second shaft. Specifically, the second shaft can be held by a simple operation, and thereby the tool accessory can be held.

According to the present invention, a technique of holding a tool accessory by a simple operation can be provided in a power tool.

DETAILED DESCRIPTION (First Embodiment)

A first embodiment of the present invention will now be described with reference to FIGS. 1 to 13. In this embodiment, an electric oscillating tool (also known as a "mulittool") is described as a representative example of a power tool according to the present invention.

Figure 1:
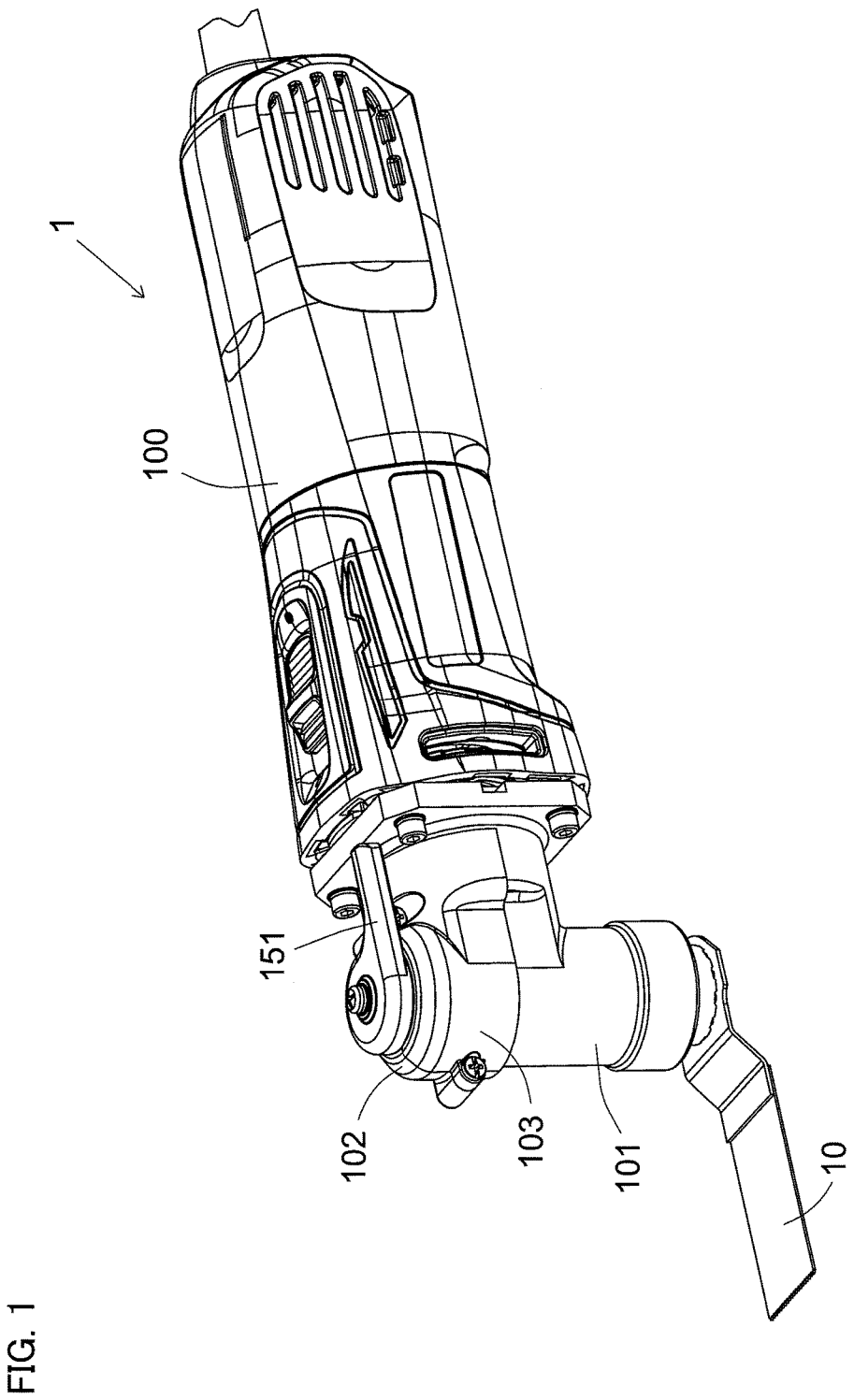
FIG. 1 is a perspective view showing the overall structure of an electric oscillating tool according to a first embodiment of the present invention.

As shown in FIG. 1, the electric oscillating tool 1 is a power tool to which a tool selected from various kinds of tools such as a blade and a polishing pad is attached and which performs an operation on a workpiece, such as a cutting operation or a polishing operation appropriate for the selected tool, by oscillating the tool attached thereto. In this embodiment, a blade 10 is described as a representative example of the tool. A tool such as the blade 10 is an example embodiment that corresponds to the "tool accessory" according to the present invention.

[Overall Structure of the Electric Oscillating Tool]

Figure 2:
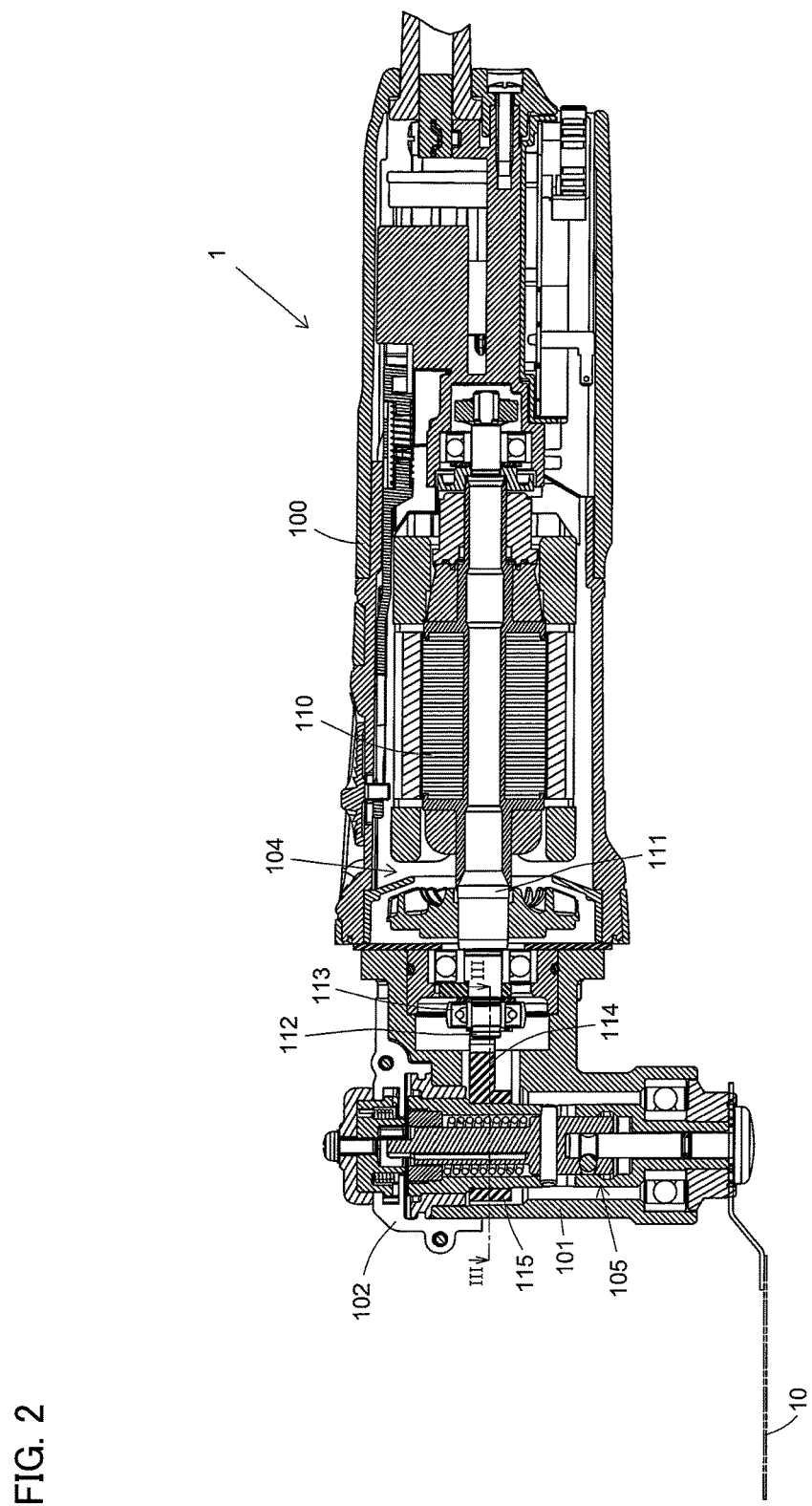
FIG. 2 is a sectional view showing the overall structure of the electric oscillating tool according to the first embodiment of the present invention.

The electric oscillating tool 1 mainly includes a body housing 100, a front housing 101, a left housing 102 and a right housing 103. The left housing 102 and the right housing 103 are fastened by screws so as to hold the front housing 101 therebetween. As shown in FIG. 2, the body housing 100 houses a driving mechanism 104. Further, the front housing 101, the left housing 102 and the right housing 103 house a tool holding mechanism 105. For the sake of expedience, the upper side and the lower side as viewed in FIG. 2 are referred to as the upper part and the lower part of the electric oscillating tool 1, respectively.

[Structure of the Driving Mechanism]

Figure 3:
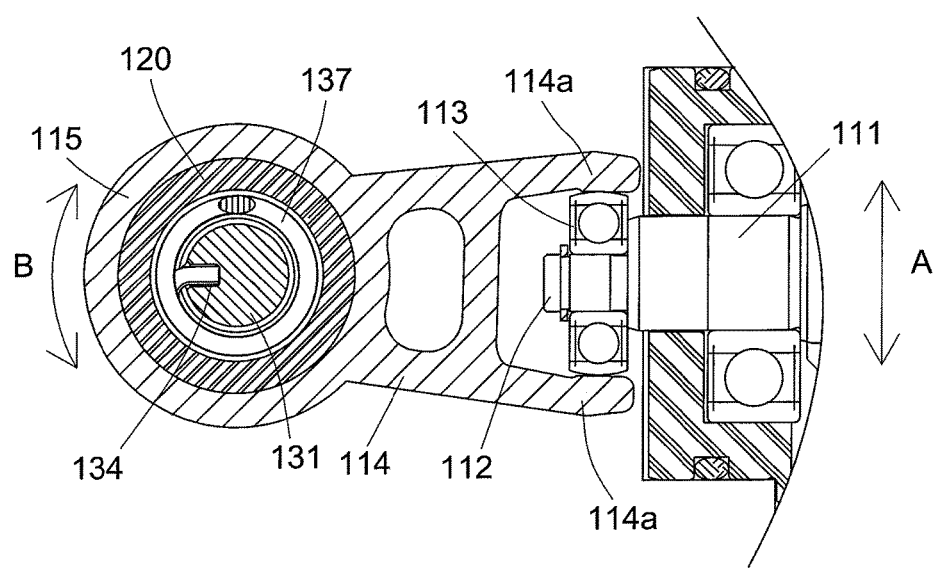
FIG. 3 is a sectional view taken along line III-III in FIG. 2.

As shown in FIGS. 2 and 3, the driving mechanism 104 mainly includes a motor 110, an eccentric shaft 112, a bearing 113, a driven arm 114 and a spindle connecting part 115. The eccentric shaft 112 is disposed on a front end of an output shaft 111 of the motor 110 and in a position displaced from the rotational axis of the output shaft 111 and extends in a direction parallel to the rotational axis. The bearing 113 is fitted on the eccentric shaft 112. The driven arm 114 has two arm parts 114a extending from the spindle connecting part 115 toward the motor 110. The driven arm 114 is disposed such that the two arm parts 114a are held into contact with the bearing 113 at two opposed points on an outer periphery of the bearing 113.

[Structure of the Tool Holding Mechanism]

Figure 4:
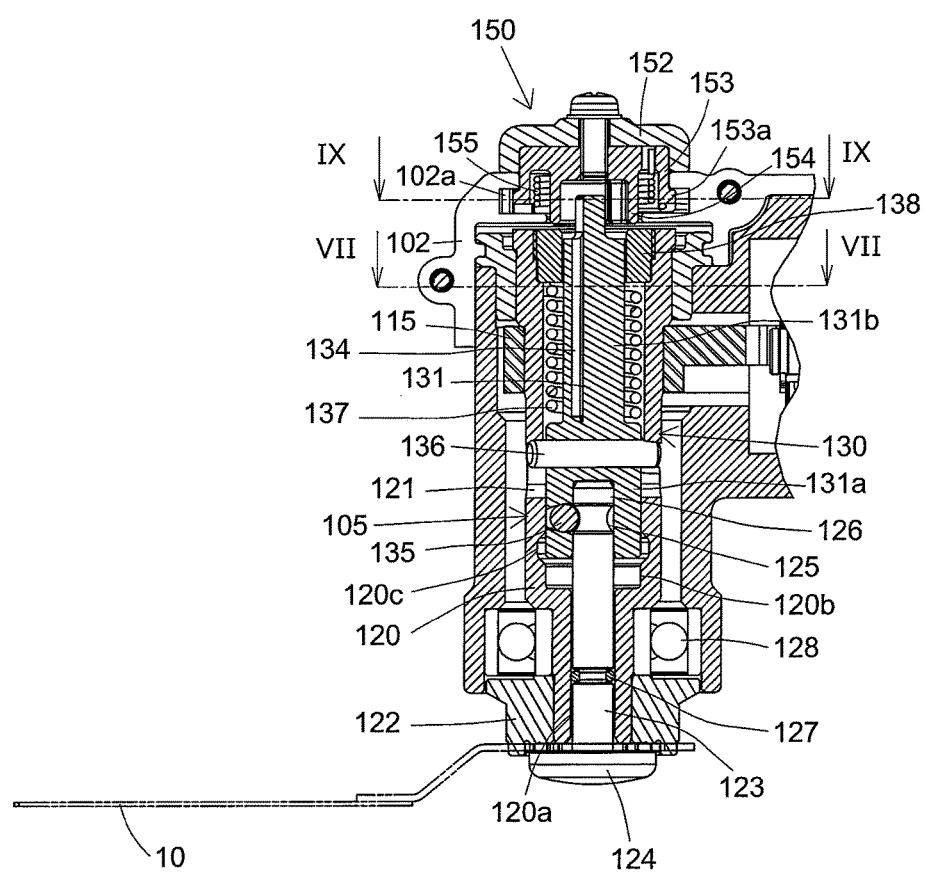
FIG. 4 is a partial, enlarged view of FIG. 2.

As shown in FIG. 4, the tool holding mechanism 105 holds the blade 10 and transmits the output of the motor 110 to the blade 10, which causes the blade 10 to oscillate. Further, the tool holding mechanism 105 mainly includes a spindle 120, a clamp shaft 123 and a clamp shaft holding mechanism 130.

The spindle 120 is a hollow cylindrical member having upper and lower open ends in its longitudinal direction, and the clamp shaft 123 can be inserted through the lower open end. This hollow part has a small-diameter portion 120a which has a diameter substantially equal to that of the clamp shaft 123, and a large-diameter portion 120b which has a larger diameter than the small-diameter portion 120a and holds a ball 135. A ball holding groove 120c is formed in an inner wall of the large-diameter portion 120b along a circumferential direction. The clamp shaft holding mechanism 130 is disposed in the large-diameter portion 120b. Further, as shown in FIG. 5, a spring receiving part 120d that locks one end of a first coil spring 137 is formed in the large-diameter portion 120b.

Figure 5:
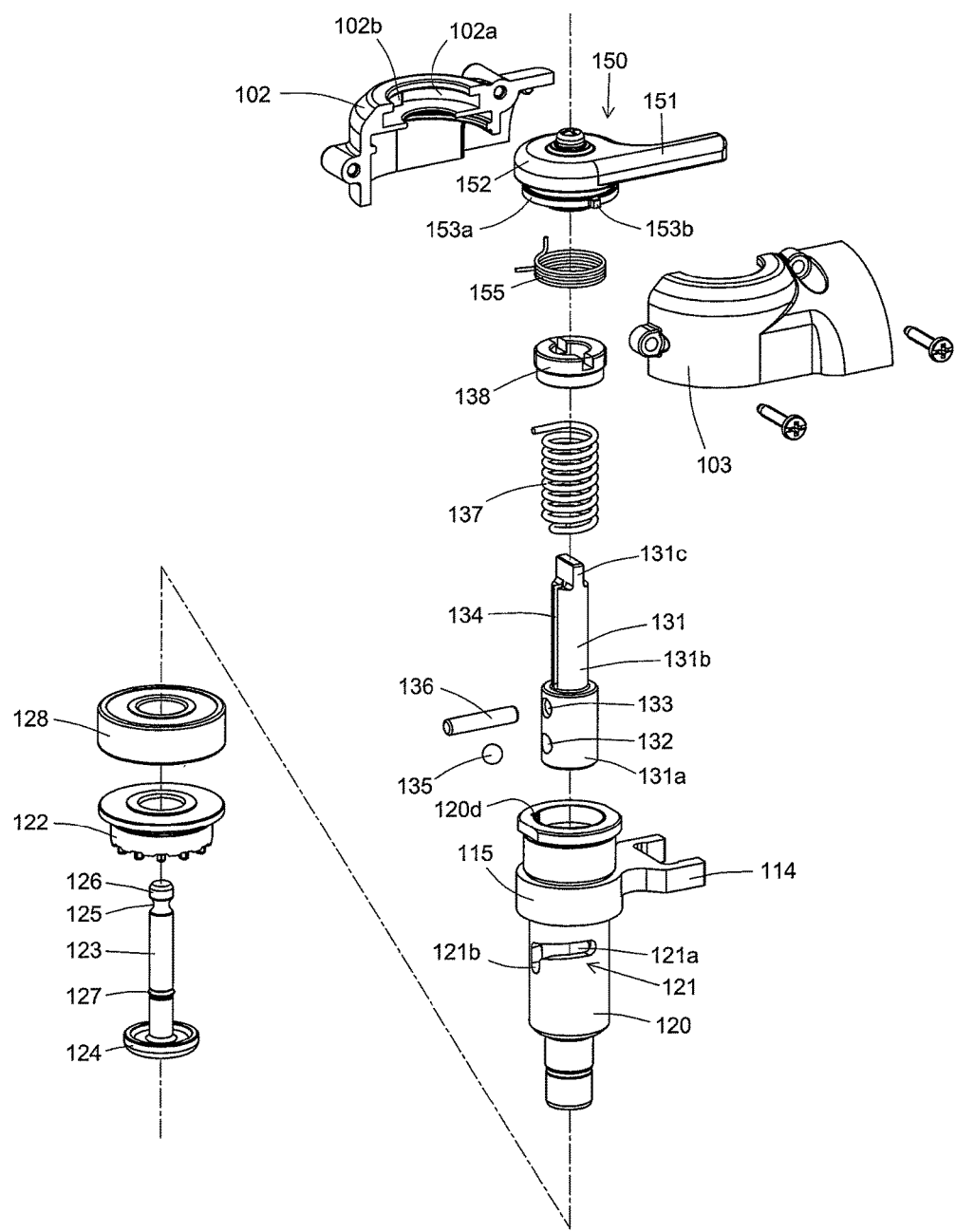
FIG. 5 is an exploded perspective view of a tool holding mechanism and a cam lever.

As shown in FIGS. 4 and 5, the spindle 120 has engagement pin insertion parts 121 through which an engagement pin 136 is inserted in a radial direction of the spindle 120. The engagement pin insertion parts 121 are formed at two places that are opposite on the outer periphery of the spindle 120. As shown in FIG. 5, the engagement pin insertion part(s) 121 has (have) a circumferentially extending part 121a which extends along the circumferential direction of the spindle 120, and an axially extending part 121b which extends along the axial direction of the spindle 120.

The spindle 120 is connected to the spindle connecting part 115 and one end of the spindle 120 is supported by the bearing 128. Thus, the spindle 120 is disposed such that it can rotate around its axis. Further, an outer flange 122 is fastened on the lower end of the spindle 120. The spindle 120 is an example embodiment that corresponds to the "first shaft" according to the present invention.

As shown in FIGS. 4 and 5, the clamp shaft 123 has a columnar shaft part, a clamp head 124 which is formed on one end of the shaft part, and an engagement recess 125 and an engagement projection 126 which are formed on the other end of the shaft part. The clamp head 124 has a circular shape and protrudes radially outward with respect to the shaft part. The engagement projection 126 has a diameter substantially equal to that of the shaft part and protrudes radially outward with respect to the engagement recess 125. Further, an O-ring 127 is fitted on the shaft part.

The clamp shaft 123 is disposed inside the spindle 120 and in parallel to the longitudinal direction of the spindle 120. The clamp shaft 123 can slide in the longitudinal direction along the inner wall of the spindle 120 and is removable from the spindle 120. The clamp shaft 123 is an example embodiment that corresponds to the "second shaft" according to the present invention.

[Structure of the Clamp Shaft Holding Mechanism]

As shown in FIGS. 4 and 5, the clamp shaft holding mechanism 130 engages with the engagement projection 126 of the clamp shaft 123 and holds the clamp shaft 123. The clamp shaft holding mechanism 130 mainly includes a ball holding member 131, the ball 135, the engagement pin 136, the first coil spring 137 and a retaining member 138.

The ball holding member 131 is a generally columnar member extending in a prescribed direction and disposed inside the spindle 120 such that it can slide in the longitudinal direction of the spindle 120. Further, the ball holding member 131 has a first portion 131a, a second portion 131b and a cam lever engagement portion 131c. The first portion 131a has a cylindrical form with an outer diameter substantially equal to the inner diameter of the large-diameter portion 120b of the spindle 120 and is configured such that the clamp shaft 123 can be inserted into the first portion 131a in the longitudinal direction of the ball holding member 131. The second portion 131b has a cylindrical form with a smaller diameter than the first portion 131a. The cam lever engagement portion 131c is formed on one end of the second portion 131b such that it protrudes from the second portion 131b in the longitudinal direction of the ball holding member 131.

As shown in FIG. 5, the first portion 131a has a ball receiving part 132 and an engagement-pin insert hole 133. One ball 135 is disposed in the ball receiving part 132. The ball receiving part 132 has a diameter slightly larger than the ball 135 such that the ball 135 can move in a radial direction of the ball holding member 131. The ball receiving part 132 extends to the central hollow portion of the first portion 131a into which the clamp shaft 123 is inserted. The engagement-pin insert hole 133 is formed through the first portion 131a and the engagement pin 136 is inserted through the insert hole 133. The engagement pin 136 is inserted and held in the first portion 131a such that both its ends protrude to the outside from the first portion 131a.

Figure 7:
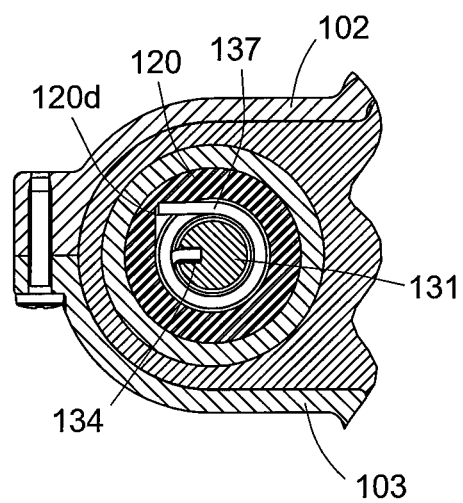
FIG. 7 is a sectional view taken along line VII-VII in FIG. 4.
Figure 8:
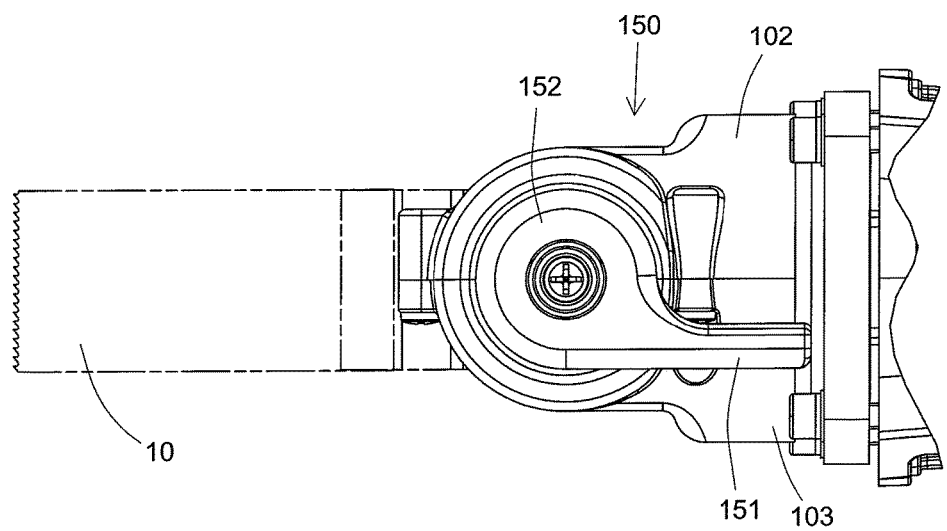
FIG. 8 is a top view of FIG. 1.

A recessed groove 134 is formed in the second portion 131b along a longitudinal direction of the ball holding member 131. The second portion 131b has a diameter smaller than the inner diameter of the large-diameter portion 120b of the spindle 120. The first coil spring 137 is disposed between the second portion 131b and the spindle 120. As shown in FIG. 7, one end of the first coil spring 137 is engaged with the recessed groove 134 and the other end is engaged with the spring receiving part 120d of the spindle 120.

The retaining member 138 is threadably mounted on the top of the spindle 120, so that the first coil spring 137 is held inside the spindle 120. At this time, the first coil spring 137 is held in a compressed state.

Figure 6:
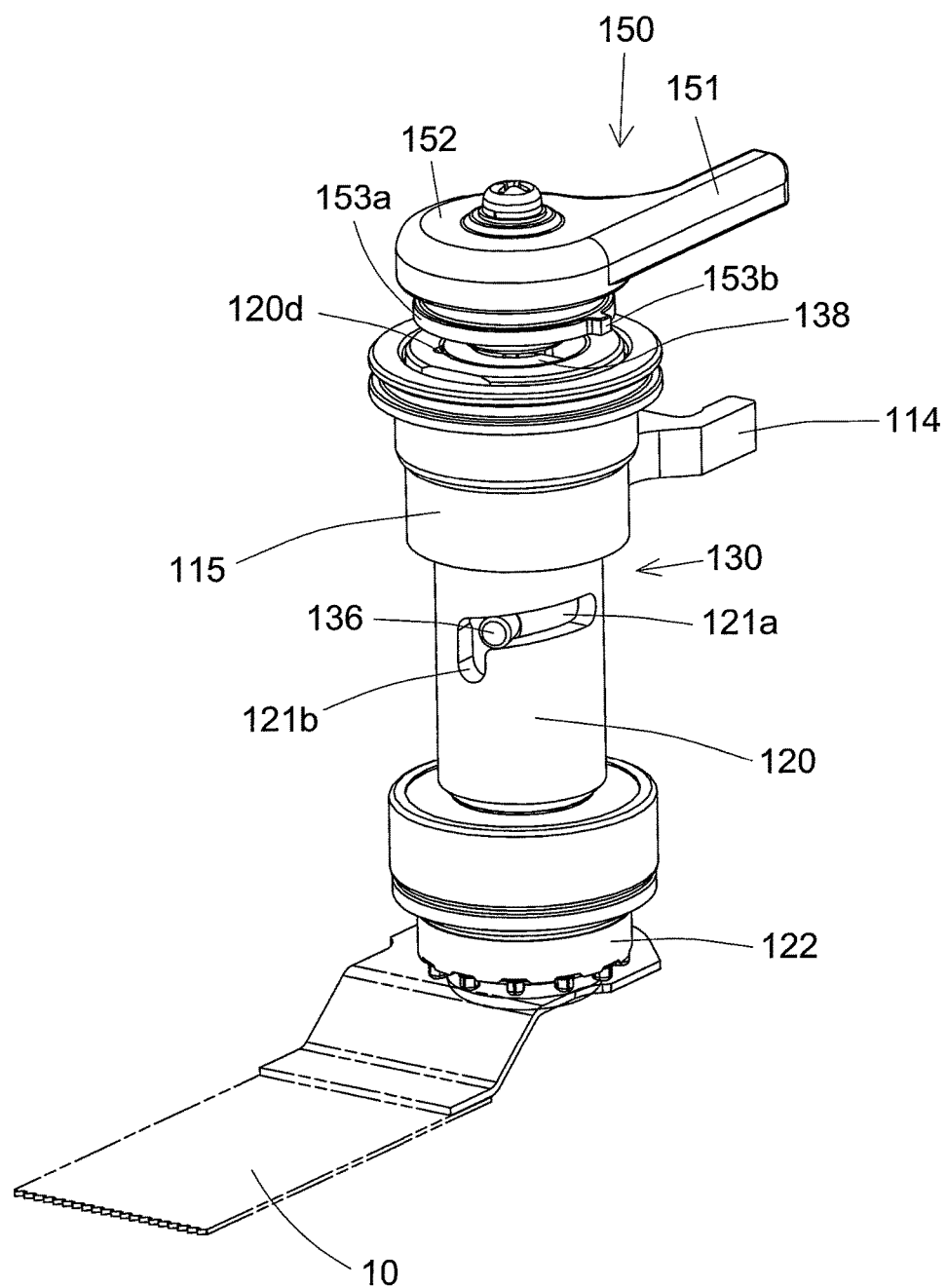
FIG. 6 is a perspective view showing the tool holding mechanism and the cam lever assembled together.

The clamp shaft holding mechanism 130 having the above-described structure is assembled as shown in FIG. 6, such that the clamp shaft 123 can be fixedly held with respect to the spindle 120. The blade 10 can be held in this manner between the outer flange 122 and the clamp head 124. The outer flange 122 and the clamp head 124 are example embodiments that correspond to the "first clamp part" and the "second clamp part", respectively, according to the present invention.

In the clamp shaft holding mechanism 130, the engagement pin 136 is located in the circumferentially extending parts 121a of the engagement pin insertion parts 121 at a position in which the torque and the axial force acting on the first coil spring 137 are balanced with each other. As a result, the ball holding member 131 is prevented from rotating with respect to the spindle 120. At this time, as shown in FIG. 4, the ball holding member 131 is held in an upper position by the torque of the first coil spring 137. The ball 135 is prevented from moving radially outward by an inner wall of the large-diameter portion 120b of the spindle 120, so that the ball 135 protrudes inward from the first portion 131a of the ball holding member 131 and is held. Thus, the ball 135 protrudes toward the engagement recess 125 of the clamp shaft 123 and engages with the engagement projection 126, so that the ball 135 fixedly holds the clamp shaft 123 with respect to the spindle 120. The ball 135 and the engagement projection 126 are example embodiments that correspond to the "holding member" and the "projection", respectively, according to the present invention. Further, the first coil spring 137 is an example embodiment that corresponds to the "first biasing member" according to the present invention.

The ball holding member 131 can be rotated with respect to the spindle 120 by turning a cam lever 150.

[Structure of the Cam Lever]

As shown in FIGS. 4 and 5, the cam lever 150 mainly includes a lever part 151, a rotating part 152 and a second coil spring 155.

The lever part 151 is connected to the rotating part 152 and is held and turned by the user to rotate the rotating part 152. The rotating part 152 is rotatably held with respect to the left housing 102 and the right housing 103. Specifically, the rotating part 152 integrally includes a first rotating part 153 and a second rotating part 154. An engagement ring 153a is formed on the first rotating part 153 such that it extends in a circumferential direction of the first rotating part 153 and protrudes in a radial direction of the first rotating part 153. Engagement grooves 102a, 103a are formed in the left housing 102 and the right housing 103, respectively. The engagement ring 153a of the first rotating part 153 is engaged with the engagement grooves 102a, 103a. The engagement ring 153a has a shorter width (length in the vertical direction) than the engagement grooves 102a, 103a. Thus, the rotating part 152 is rotatably held by the left housing 102 and the right housing 103.

Figure 9:
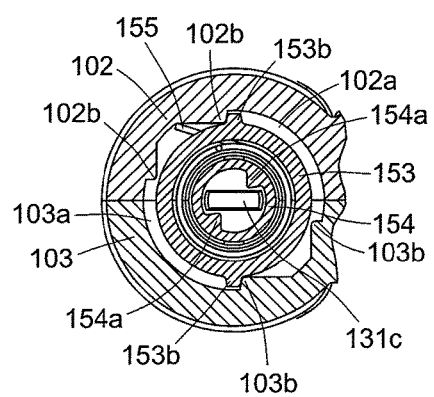
FIG. 9 is a sectional view taken along line IX-IX in FIG. 4.

As shown in FIGS. 5 and 9, the engagement ring 153a has two locking projections 153b. The locking projections 153b protrude outward from the engagement ring 153a in the radial direction of the first rotating part 153. In the left housing 102 and the right housing 103, the engagement grooves 102a, 103a have locking parts 102b, 103b which can be engaged with the locking projections 153b. When the locking projections 153b are engaged with the locking parts 102b, 103b, the rotating part 152 and the lever part 151 are prevented from rotating.

As shown in FIG. 9, the second rotating part 154 has two engagement parts 154a. The engagement parts 154a can be engaged with the cam lever engagement part 131c of the ball holding member 131. Thus, when the lever part 151 is turned, the rotating part 152 is rotated so that the ball holding member 131 can be rotated by a prescribed angle with respect to the spindle 120.

As shown in FIG. 4, the second coil spring 155 is disposed between the first rotating part 153 and the second rotating part 154 in a radial direction of the rotating part 152. One end of the second coil spring 155 is held by the left housing 102 and the other end is held by the rotating part 152. The second coil spring 155 biases the rotating part 152 upward as viewed in FIG. 4 into contact with the left housing 102 and the right housing 103. Further, the second coil spring 155 is held by the left housing 102 and the rotating part 152 such that torque acts on the second coil spring 155 by turning the cam lever 150.

Figure 10:
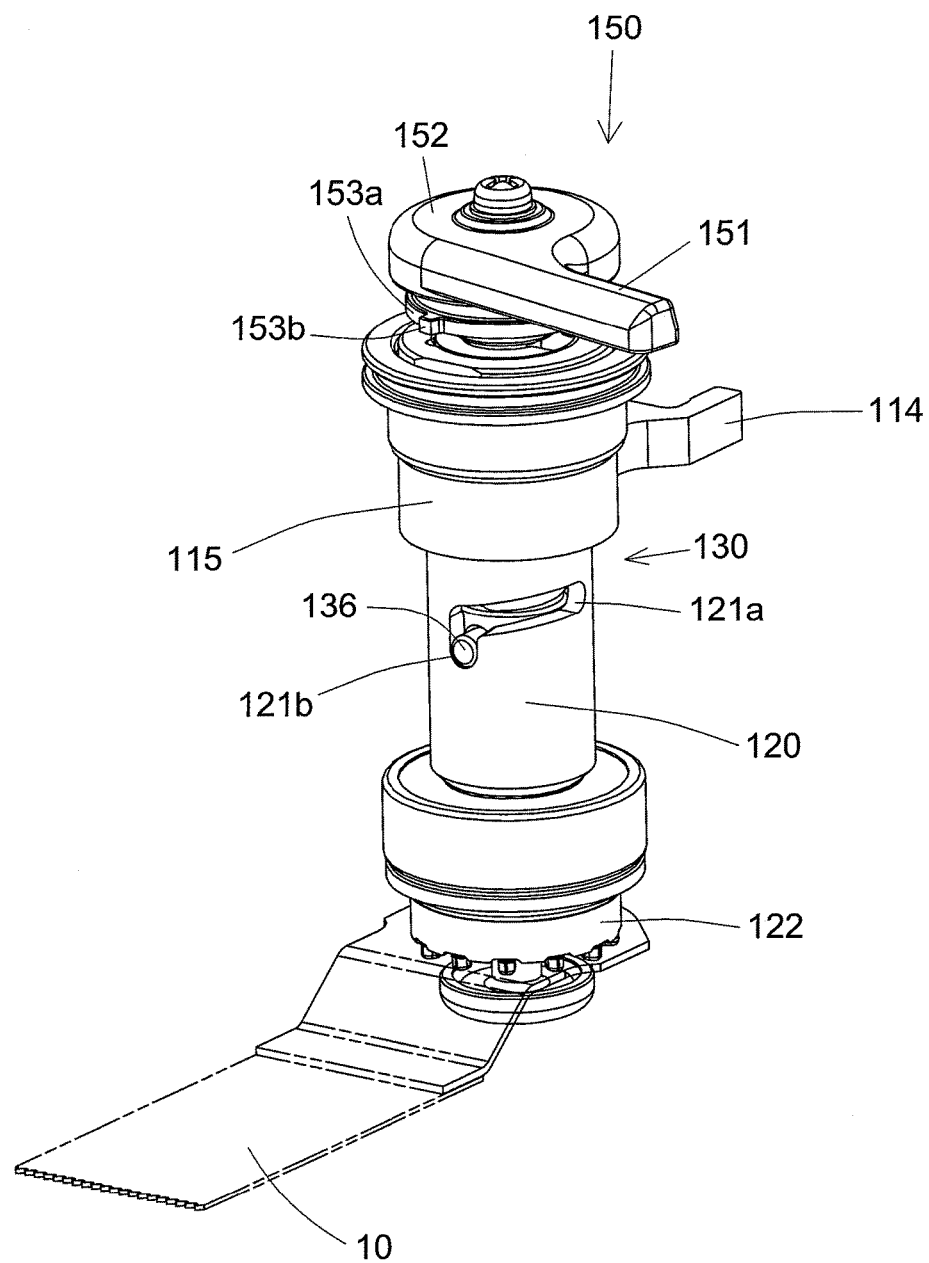
FIG. 10 is a perspective view corresponding to FIG. 6, showing a state in which the cam lever is turned.
Figure 11:
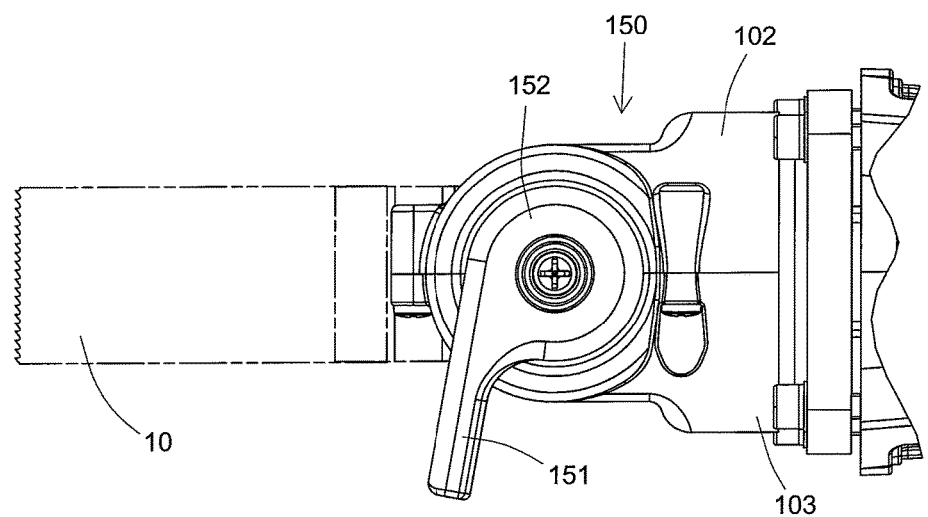
FIG. 11 is a top view corresponding to FIG. 8, showing the state in which the cam lever is turned.
Figure 12:
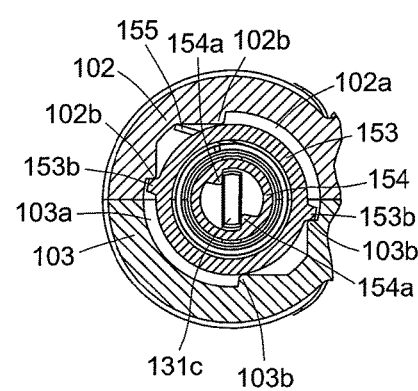
FIG. 12 is a sectional view corresponding to FIG. 9, showing the state in which the cam lever is turned.

When the lever part 151 of the cam lever 150 configured as described above is turned from the position shown in FIG. 8 to the position shown in FIG. 11, the lever engagement part 131c is rotated from the position shown in FIG. 9 to the position shown in FIG. 12. Specifically, the ball holding member 131 rotates relative to the spindle 120. When the cam lever 150 is turned, torque is applied to the first coil spring 137 engaged with the ball holding member 131. As the ball holding member 131 rotates, the engagement pin 136 moves within the circumferentially extending parts 121a that are inclined with respect to the circumferential direction of the spindle 120. When the engagement pin 136 has moved to the point where the circumferentially extending part 121a meets the axially extending part 121b, the ball holding member 131 is moved downward by the axial biasing force of the previously-compressed first coil spring 137, and the engagement pin 136 is engaged with the axially extending part 121b. Specifically, the ball holding member 131 moves from the position shown in FIGS. 4 and 6 to the position shown in FIGS. 13 and 10.

Figure 13:
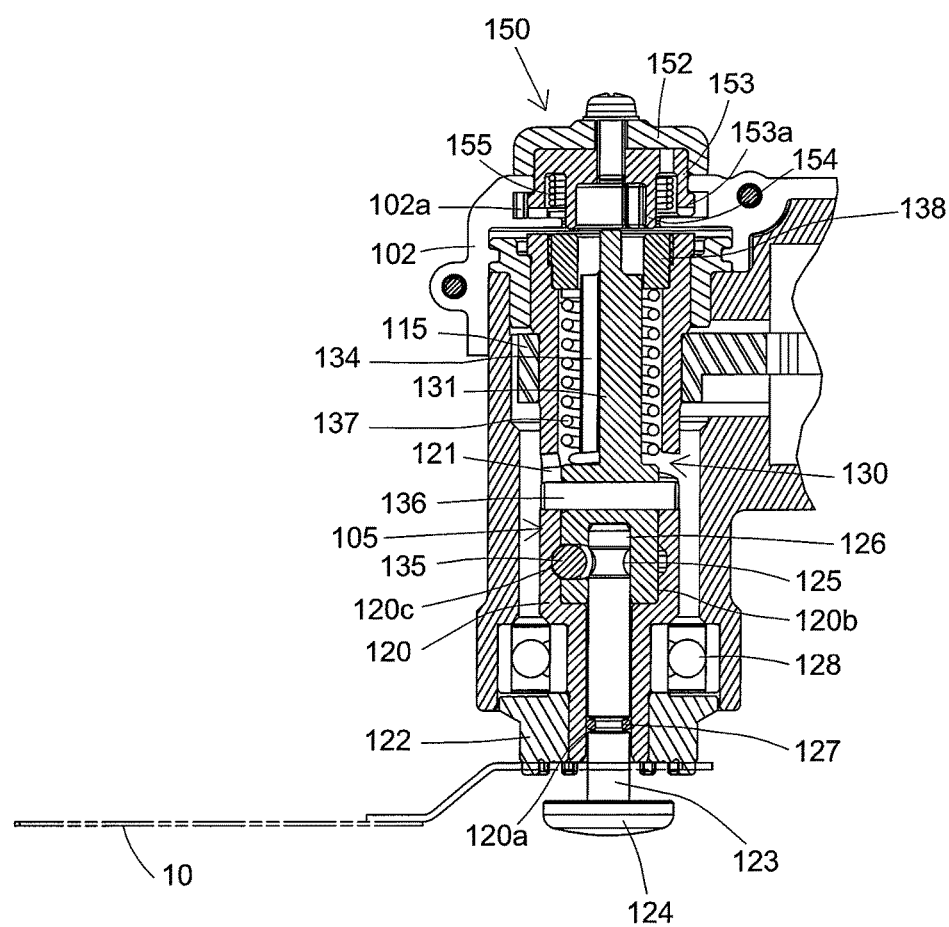
FIG. 13 is a perspective view corresponding to FIG. 4, showing the state in which the cam lever is turned.

As shown in FIG. 10, when the engagement pin 136 is engaged with the axially extending parts 121b, the position of the ball holding member 131 is locked by the axial biasing force of the first coil spring 137. Specifically, the engagement pin 136 prevents rotation of the ball holding member 131 by engagement with the axially extending part 121b. At this time, the ball holding member 131 causes the ball 135 to move in the longitudinal direction of the spindle 120 such that the ball 135 is positioned in the ball holding groove 120c. As a result, as shown in FIG. 13, the ball 135 disengages from the engagement projection 126 of the clamp shaft 123, so that the clamp shaft 123 can be removed. Therefore, the blade 10 held between the outer flange 122 and the clamp shaft 123 can be removed.

At this time, the O-ring 127 on the clamp shaft 123 generates a frictional force by contact with the small-diameter portion 120a of the spindle 120, which prevents the clamp shaft 123 from coming off. The O-ring 127 is an example embodiment that corresponds to the "elastic member" according to the present invention.

The ball holding member 131 configured as described above is an example embodiment that corresponds to the "moving member" according to the present invention. The engagement pin 136 protruding radially from the ball holding member 131 and the engagement pin insertion part(s) 121 formed in the spindle 120 are example embodiments that correspond to the "engagement projection" and the "engagement recess(es)", respectively, according to the present invention. The circumferentially extending part(s) 121a and the axially extending part(s) 121b are example embodiments that correspond to the "first recess" and the "second recess", respectively, according to the present invention. The ball holding groove 120c is an example embodiment that corresponds to the "retreat part" according to the present invention.

Further, when the cam lever 150 is turned, torque also acts on the second coil spring 155. At this time, when the engagement pin 136 is engaged with the axially extending parts 121b, the ball holding member 131 is prevented from rotating. Therefore, when the user releases the cam lever 150, the cam lever 150 is turned from the position shown in FIG. 11 to the position shown in FIG. 8 by the torque that was applied to the second coil spring 155. Specifically, in the electric oscillating tool 1, the cam lever 150 returns to an initial position shown in FIG. 8 while the clamp shaft 123 is held in the removable state. The second coil spring 155 is an example embodiment that corresponds to the "third biasing member" according to the present invention. Further, the cam lever 150 is an example embodiment that corresponds to the "operating member" according to the present invention.

In order to mount the blade 10, the blade 10 is fitted onto the clamp shaft 123 and the clamp shaft 123 is inserted into the spindle 120. The clamp shaft 123 is brought into contact with the ball holding member 131 by moving the clamp shaft 123 in the longitudinal direction of the spindle 120. When the clamp shaft 123 is further moved against the axial biasing force of the first coil spring 137, the ball holding member 131 is moved upward in the electric oscillating tool 1. At this time, the ball 135 is moved upward out of the ball holding groove 120c in the electric oscillating tool 1.

When the ball holding member 131 moves, the engagement pin 136 moves within the axially extending part(s) 121b toward the connection where the axially extending part 121b meets the circumferentially extending part 121a. When the engagement pin 136 reaches the connection between the axially extending part 121b and the circumferentially extending part 121a, the engagement pin 136 moves into the circumferentially extending part(s) 121a by using the reaction of the torque that was applied to the first coil spring 137 by the turning of the cam lever 150. Specifically, when the ball holding member 131 rotates to the position shown in FIG. 6 in which the torque and the axial force acting on the first coil spring 137 are balanced with each other, the ball holding member 131 and the engagement pin 136 are held in this position. Thus, the clamp shaft 123 is held by the spindle 120 via the ball 135, and the blade 10 is held between the outer flange 122 and the clamp head 124.

In the electric oscillating tool 1 configured as described above, when the motor 110 is driven, as shown in FIG. 3, rotation of the output shaft 111 is converted into reciprocating motion in the direction shown by arrow A (hereinafter referred to as direction A) via the eccentric shaft 112 and the bearing 113. The reciprocating motion in direction A is transmitted to the driven arm 114 and then converted into rotation of a predetermined angle on the spindle connecting part 115 in the circumferential direction of the spindle 120 which is shown by arrow B (hereinafter referred to as direction B). Thus, the spindle 120 connected to the spindle connecting part 115 is driven to reciprocate in direction B. As a result, an operation such as a cutting operation can be performed on the workpiece by oscillating the blade 10 held between the outer flange 122 and the clamp head 124.

According to the above-described first embodiment, the ball holding member 131 slides in the longitudinal direction of the spindle 120 by rotating relative to the spindle 120, and as a result, the clamp shaft 123 is allowed to be removed. In this state, the ball holding member 131 is prevented from moving by the biasing force of the first coil spring 137. Therefore, it is not necessary for the user to operate the cam lever 150 when mounting the clamp shaft 123 and the blade 10. Thus, the blade 10 can be held and mounted by a simple operation.

According to the first embodiment, when the cam lever 150 is turned, torque is applied to the first coil spring 137, so that the ball holding member 131 can be prevented from moving by cooperation of the axial force and the torque of the first coil spring 137. Thus, the ball holding member 131 can be held in a predetermined position.

According to the first embodiment, by provision of the structure in which the clamp shaft 123 is held by engagement between the radially protruding engagement projection 126 and the ball 135, the clamp shaft 123 can be reliably held without the need of a large clamping force, as compared with a structure in which the clamp shaft 123 is held by a clamping force applied in the radial direction of the clamp shaft 123.

Further, according to the first embodiment, with the structure in which the O-ring 127 is fitted on the clamp shaft 123, a frictional force is generated between the O-ring 127 and the spindle 120 and can prevent the clamp shaft 123 from accidentally coming off.

In the above-described first embodiment, the engagement pin 136 is provided in the ball holding member 131 and the engagement pin insertion parts 121 are provided in the spindle 120, but the present invention is not limited to this. For example, the engagement pin 136 may be provided in the spindle 120 and the engagement pin insertion parts 121 engaged with the engagement pin 136 may be provided in an outer periphery of the ball holding member 131.

In the first embodiment, only one ball 135 is provided, but it may be configured such that the clamp shaft 123 is held by a plurality of balls 135.

Further, although the O-ring 127 is fitted on the clamp shaft 123 in the first embodiment, it may be fitted inside the spindle 120. Further, not only the O-ring 127 but also another elastic member such as rubber and resin may be provided in order to generate a frictional force between the clamp shaft 123 and the spindle 120.

(Second Embodiment)

A second embodiment will now be described. However, components in this embodiment which are identical to those in the first embodiment will be given like numerals as in the first embodiment, and they are not described herein.

[Overall Structure of the Electric Oscillating Tool]

Figure 14:
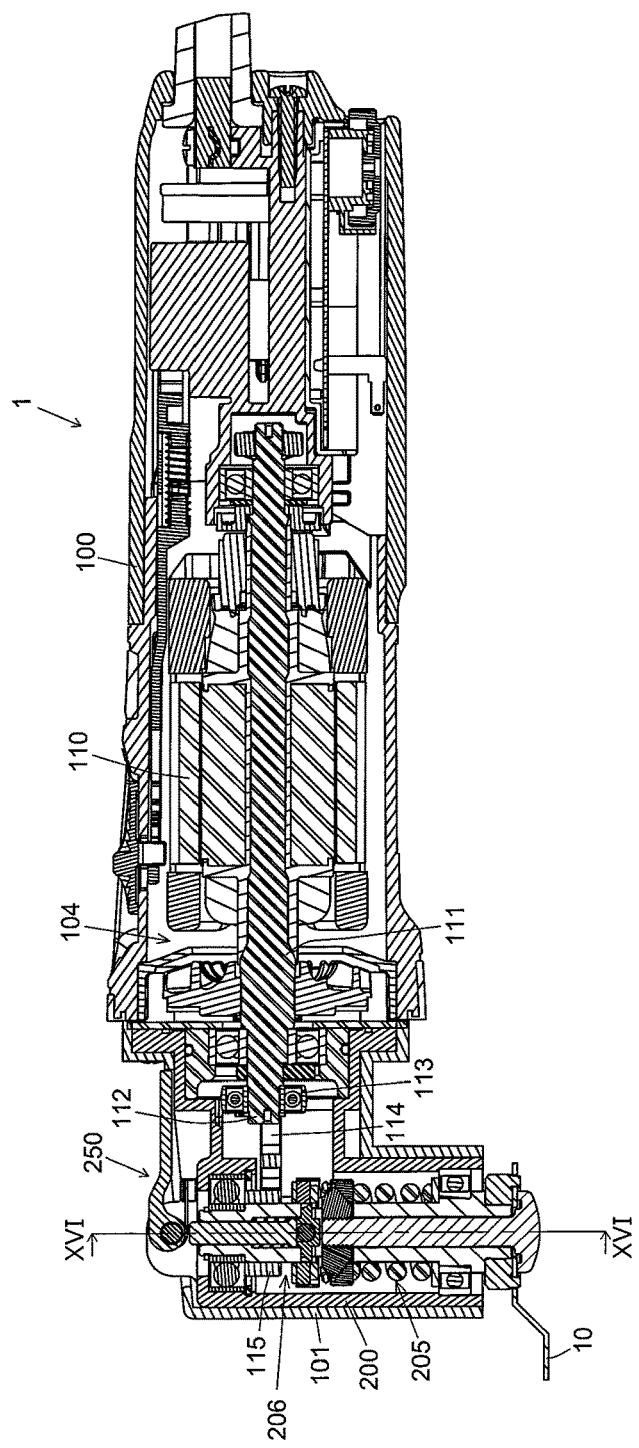
FIG. 14 is a sectional view showing the overall structure of an electric oscillating tool according to a second embodiment of the present invention.

As shown in FIG. 14, the electric oscillating tool 1 mainly includes the body housing 100, the front housing 101, a gear housing 200, the driving mechanism 104, a tool holding mechanism 205 and a tool releasing mechanism 206.

[Structure of the Tool Holding Mechanism]

Figure 15:
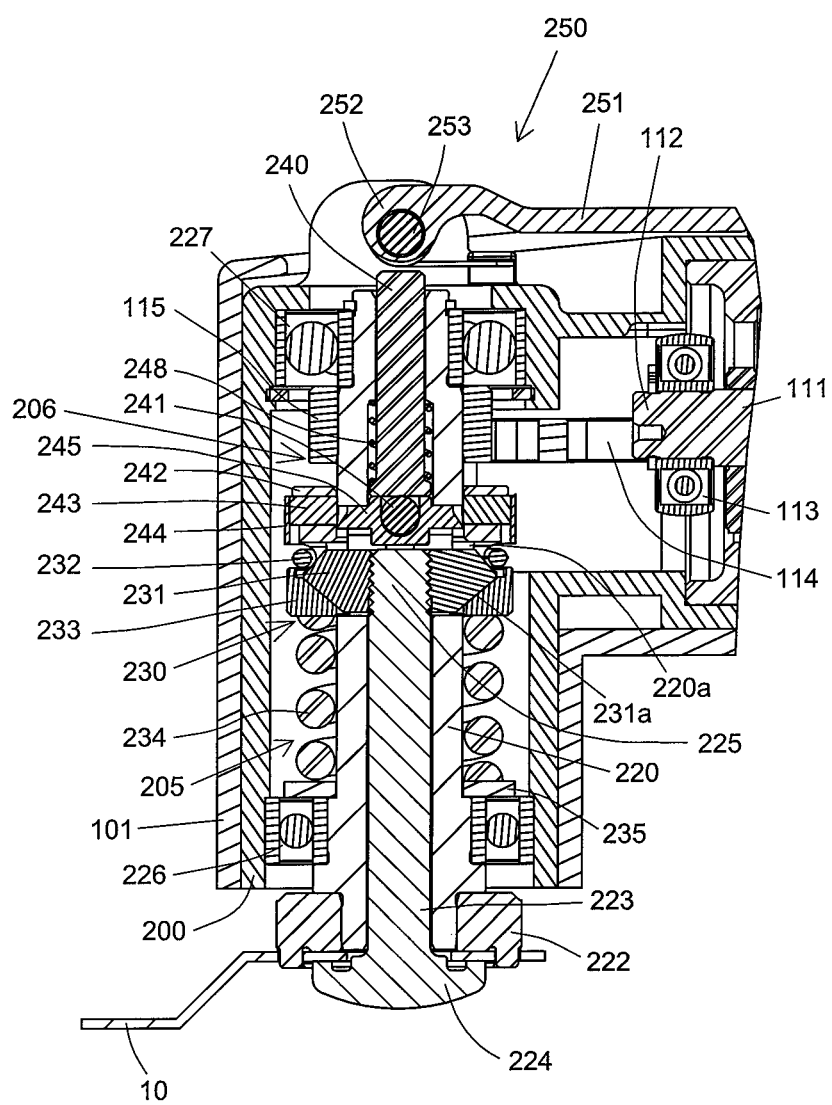
FIG. 15 is a partial, enlarged view of FIG. 14.

As shown in FIG. 15, the tool holding mechanism 205 of the second embodiment mainly includes a spindle 220, a clamp shaft 223 and a clamp shaft holding mechanism 230.

Figure 16:
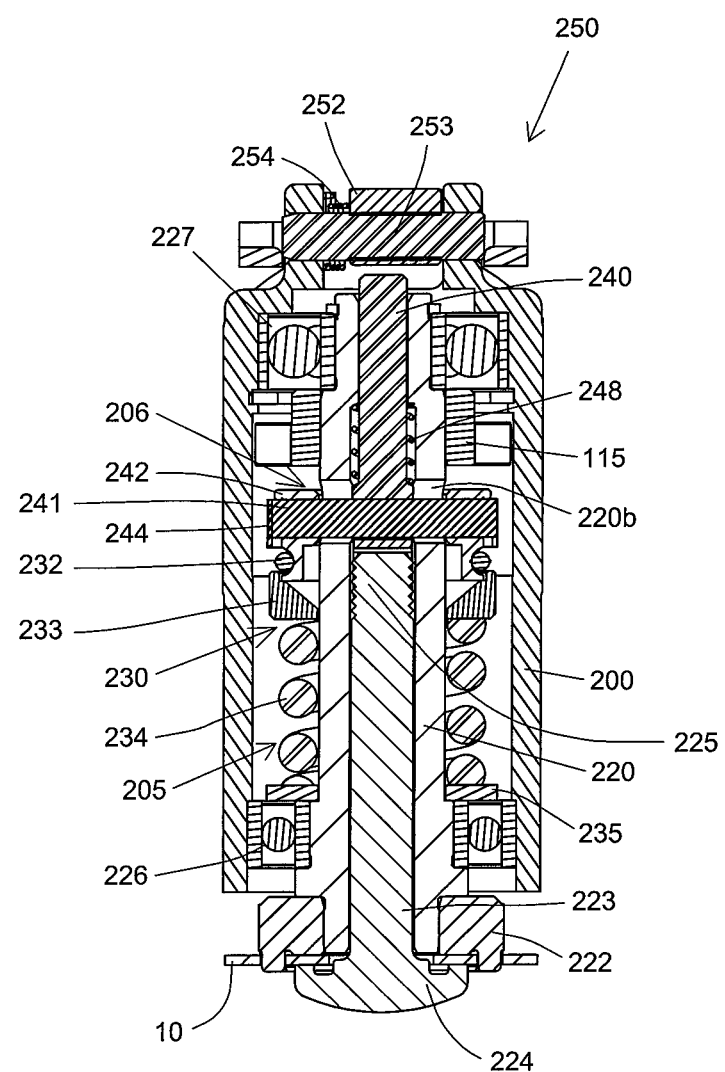
FIG. 16 is a sectional view taken along line XVI-XVI in FIG. 14.
Figure 17:
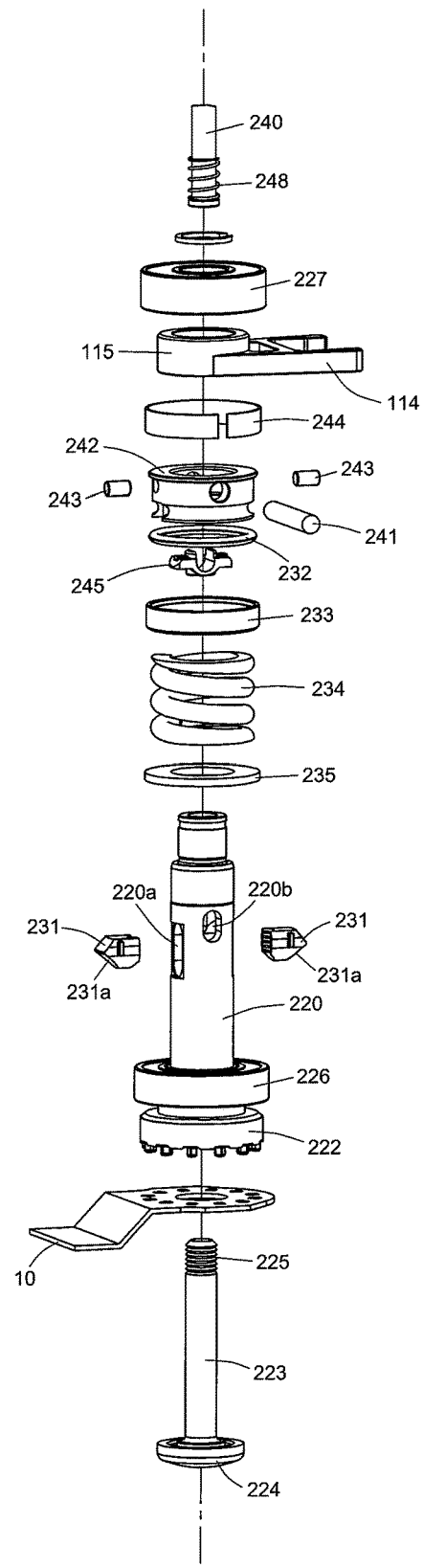
FIG. 17 is an exploded perspective view of a tool holding mechanism and a tool releasing mechanism.

As shown in FIGS. 15 to 17, the spindle 220 is a hollow cylindrical member and is disposed such that an axis of the spindle 220 extends in a direction crossing the output shaft 111 of the motor 110. The spindle 220 is supported at two points in the longitudinal direction by the gear housing 200 via bearings 226, 227 such that the spindle 220 can rotate around its axis. The spindle 220 has a clamping member insert hole 220*a* formed in a middle region between the bearings 226, 227 in the longitudinal direction and extending through the spindle 220 in its radial direction. Further, the spindle 220 has an engagement pin insert hole 220*b* formed in a middle region between the clamping member insert hole 220*a* and the bearing 227 in the longitudinal direction and extending through the spindle 220 in its radial direction. The engagement pin insert hole 220*b* extends in a direction crossing the clamping member insert hole 220*a*. An outer flange 222 is mounted onto a front end of the spindle 220 on the outside of the gear housing 200. The spindle 220 is an example embodiment that corresponds to the "first shaft" according to the present invention.

The clamp shaft 223 is a generally columnar member; it has a clamp head 224 integrally formed on one end and a clamped part 225 clamped with a clamping member 231 on the other end. The clamped part 225 comprises a plurality of grooves formed along the circumferential direction of the clamp shaft 223. The clamp shaft 223 is disposed inside the spindle 220 such that it can slide in the longitudinal direction of the spindle 220 and extends in parallel to the longitudinal direction. The clamp shaft 223 is removable from the spindle 220. The clamp shaft 223 is an example embodiment that corresponds to the "second shaft" according to the present invention.

The spindle 220 and the clamp shaft 223 which are configured as described above are provided such that the blade 10 can be held between the outer flange 222 and the clamp head 224. The outer flange 222 and the clamp head 224 are example embodiments that correspond to the "first clamp part" and the "second clamp part", respectively, according to the present invention.

[Structure of the Clamp Shaft Holding Mechanism]

Figure 18:
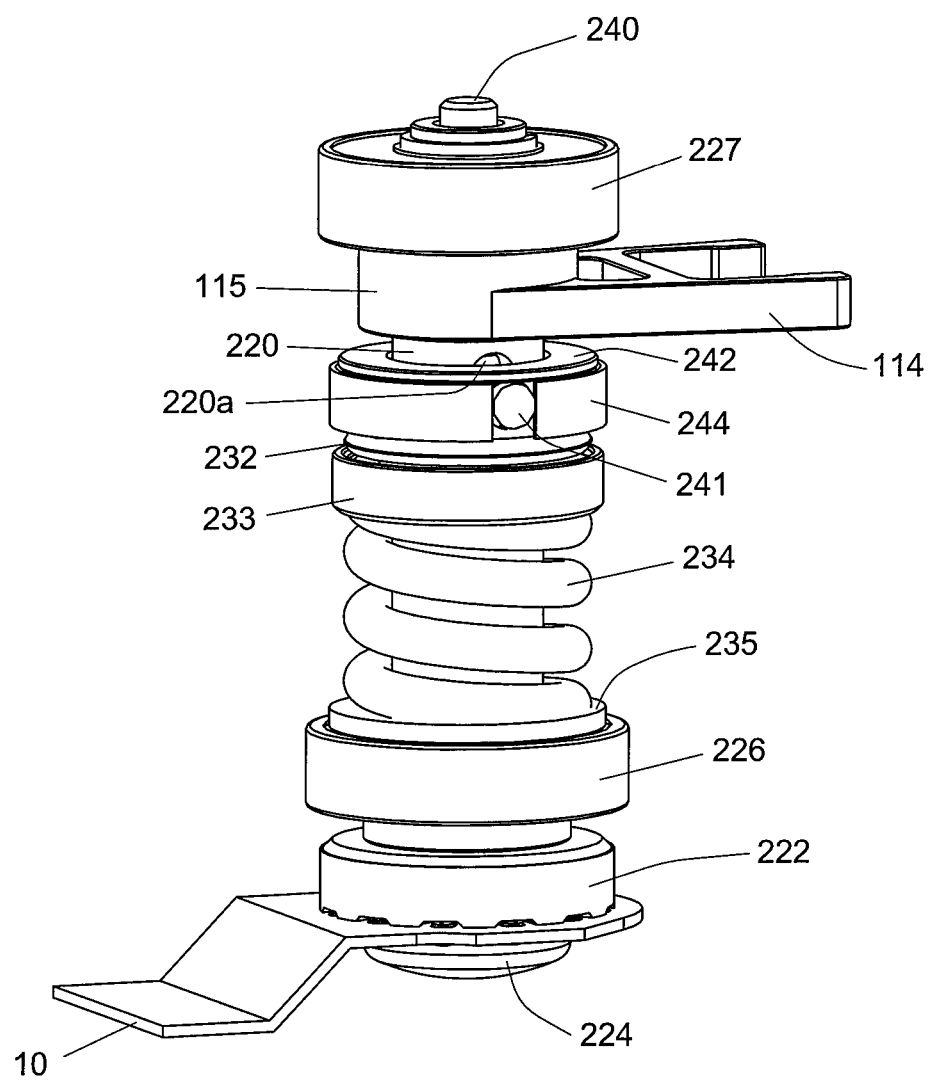
FIG. 18 is a perspective view showing the tool holding mechanism and the tool releasing mechanism assembled together.

As shown in FIGS. 15 and 16, the clamp shaft holding mechanism 230 serves to hold the clamped part 225 of the clamp shaft 223 and mainly includes a clamping member 231, an O-ring 232, an annular member 233, a first coil spring 234 and a spring receiving member 235. FIG. 17 is an exploded perspective view showing the components and FIG. 18 shows the components assembled together.

The two clamping members 231 are opposed to each other in the circumferential direction of the spindle 220. Each of the clamping members 231 is inserted through the clamping member insert hole 220*a* and can move in the radial direction of the spindle 220 in the clamping member insert hole 220*a*. A plurality of projections are formed in a portion of the clamping member 231 facing the clamp shaft 223 and can be engaged with the grooves of the clamped part 225. Further, the clamping member 231 has an inclined surface 231*a*, which is inclined with respect to the longitudinal direction of the spindle 220 and which engages with an inclined surface of the annular member 233.

The O-ring 232 is disposed on the outside of the clamping members 231. The O-ring 232 biases the clamping members 231 radially toward the center of the spindle 220, so that the projections of the clamping members 231 engage with the clamped part 225 of the clamp shaft 223 disposed inside the spindle 220 and hold the clamp shaft 223. Further, even when the clamping members 231 are not holding the clamp shaft 223, the O-ring 232 applies a biasing force to the clamping members 231 so as to retain the posture of the clamping members 231.

The annular member 233 surrounds the outer periphery of the clamping members 231 in the radial direction of the spindle 220 and can move in the longitudinal direction of the spindle 220. The annular member 233 has an inclined surface which engages with the inclined surfaces 231*a* of the clamping members 231. The first coil spring 234 is disposed along the outer periphery of the spindle 220 between the annular member 233 and the bearing 226, and is supported by the bearing 226 via the spring receiving member 235. The annular member 233 is held biased in the longitudinal direction of the spindle 220 by the biasing force of the first coil spring 234. The annular member 233 engages with the inclined surfaces 231*a* of the clamping members 231 and biases the clamping members 231 in the radial direction of the spindle 220. Specifically, the clamping members 231 are moved in the radial direction of the spindle 220 by engagement of the inclined surfaces of the clamping members 231 and the annular member 233.

In the clamp shaft holding mechanism 230 configured as described above, the O-ring 232 biases the clamping members 231 in the radial direction of the spindle 220 such that the clamp shaft 233 is held. Further, the annular member 233 biased by the first coil spring 234 engages with the inclined surfaces 231*a* of the clamping members 231, so that the biasing force of the first coil spring 234 is converted into a biasing force in the radial direction of the spindle 220. Thus, the clamping members 231 are biased in the radial direction of the spindle 220 by the first coil spring 234 and clamp the clamp shaft 223. Specifically, the clamp shaft 223 is held by the biasing force of the O-ring 232 or the biasing force of the first coil spring 234. The O-ring 232 or the first coil spring 234 is an example embodiment that corresponds to the "second biasing member" according to the present invention.

Further, the first coil spring 234 biases the annular member 233 upward in the electric oscillating tool 1 in the longitudinal direction of the spindle 220. Specifically, the first coil spring 234 biases the clamping members 231 so as to clamp the clamp shaft 223 and bias the clamp shaft 223 upward. Thus, the clamp head 224 is biased toward the outer flange 222, so that the blade 10 is held between the outer flange 222 and the clamp head 224. The clamp shaft holding mechanism 230 is an example embodiment that corresponds to the "holding member" according to the present invention.

[Structure of the Tool Releasing Mechanism]

As shown in FIGS. 15 and 16, the tool releasing mechanism 206 releases the hold of the clamp shaft 223 by the clamp shaft holding mechanism 230 and thereby allows removal of the blade 10 held between the spindle 220 and the clamp shaft 223. The tool releasing mechanism 206 mainly includes a thrust pin 240, a first engagement pin 241, a clamp shaft releasing member 242, second engagement pins 243, a C-ring 244, a pressing member 245 and a cam lever 250.

The thrust pin 240 is disposed inside the spindle 220 such that it can slide in the longitudinal direction of the spindle 220. A lower end region of the thrust pin 240 is configured to protrude in a radial direction of the thrust pin 240. As shown in FIG. 16, the first engagement pin 241 is inserted through the engagement pin insert hole 220b of the spindle 220 and is engaged with the clamp shaft releasing member 242.

As shown in FIGS. 15-17, the clamp shaft releasing member 242 is a generally cylindrical member, which surrounds the outer periphery of the spindle 220 and which can move together with the first engagement pin 241 in the longitudinal direction of the spindle 220 in engagement with the first engagement pin 241. Further, the clamp shaft releasing member 242 is held at its lower end in contact with the annular member 233 and can move together with the annular member 233 in the longitudinal direction of the spindle 220.

The second engagement pins 243 are held in a through hole formed in the clamp shaft releasing member 242 and can move in the radial direction of the spindle 220. Two such second engagement pins 243 are opposed to each other in a circumferential direction of the clamp shaft releasing member 242. As shown in FIG. 15, each of the second engagement pins 243 has such a length that they protrude from the outer periphery of the clamp shaft releasing member 242 when inserted into the through hole until they come into contact with the spindle 220 inside the clamp shaft releasing member 242.

The C-ring 244 is a C-shaped leaf spring and is fitted onto the clamp shaft releasing member 242. The C-ring 244 is held into contact with the outer periphery of the clamp shaft releasing member 242 and the second engagement pins 243 protruding from the outer periphery of the clamp shaft releasing member 242 and biases the second engagement pins 243 toward the inside of the clamp shaft releasing member 242.

Figure 19:
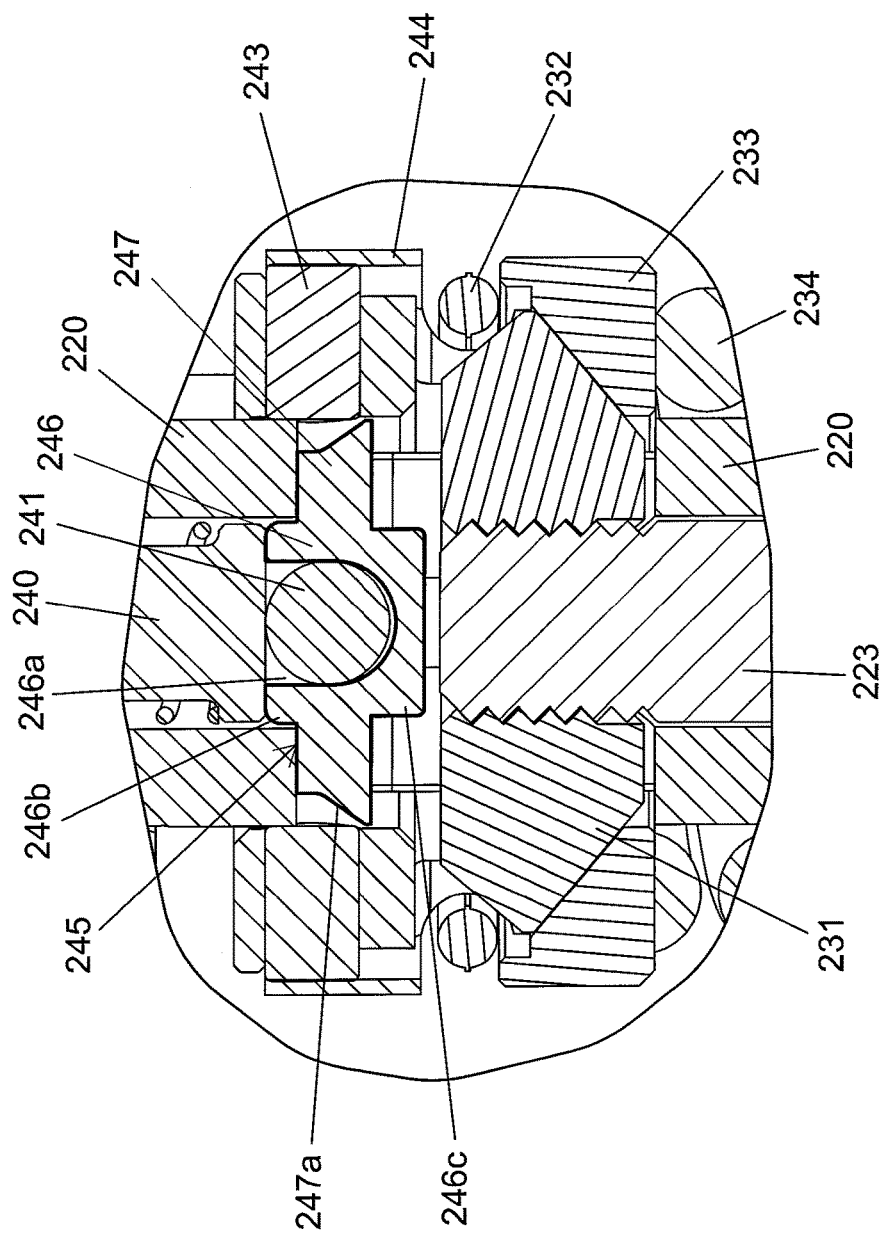
FIG. 19 is a partial, enlarged view of FIG. 15.

As shown in FIG. 19, the pressing member 245 is engaged with the outer periphery of the first engagement pin 241 and can slide in the longitudinal direction of the spindle 220. The pressing member 245 is disposed inside the clamp shaft releasing member 242; it has a central part 246 and an extending part 247 extending horizontally from the central part 246. The length of the pressing member 245 from one end to the other end of the extending part 247 is substantially equal to the outer diameter of the spindle 220.

The central part 246 is smaller than the inner diameter of a hollow region of the spindle 220 and has a recess 246a which is fitted onto the first engagement pin 241. A first protrusion 246b is formed in an upper region of the central part 246 and protrudes upward from the extending part 247. Further, a second protrusion 246c is formed in a lower region of the central part 246 and protrudes downward from the extending part 247.

The extending part 247 has a lower end and an upper end having a shorter length in the radial direction of the spindle 220 than the lower end, so that the extending part 247 has an inclined surface 247a on its outer end.

As shown in FIG. 15, a thrust pin holding spring 248 is disposed between the thrust pin 240 and the spindle 220. The thrust pin holding spring 248 is held in contact with the protrusion formed in the lower end region of the thrust pin 240 and the spindle 220, and biases the thrust pin 240 downward.

[Structure of the Cam Lever]

As shown in FIG. 15, the cam lever 250 is a member for sliding the thrust pin 240 in the longitudinal direction of the spindle 220 by contact with the thrust pin 240. The cam lever 250 mainly includes a lever part 251, a pivot shaft 252, a rotating part 253 and a second coil spring 254.

The cam lever 250 is designed such that the lever part 251 can be turned on the pivot shaft 252 extending perpendicularly to the longitudinal direction of the spindle 220. The rotating part 253 is fitted on the pivot shaft 252 and can come into contact with the thrust pin 240. The rotating part 253 has its center in a position displaced from the axis of the pivot shaft 252, so that the distance from the axis of the pivot shaft 252 to the outer periphery of the rotating part 253 varies. Further, as shown in FIG. 16, the second coil spring 254 is fitted adjacent to the rotating part 253 on the pivot shaft 252. The second coil spring 254 biases the rotating part 253 so as to apply a clockwise biasing force as viewed in FIG. 15 in a circumferential direction of the pivot shaft 252 to the lever part 251.

Figure 20:
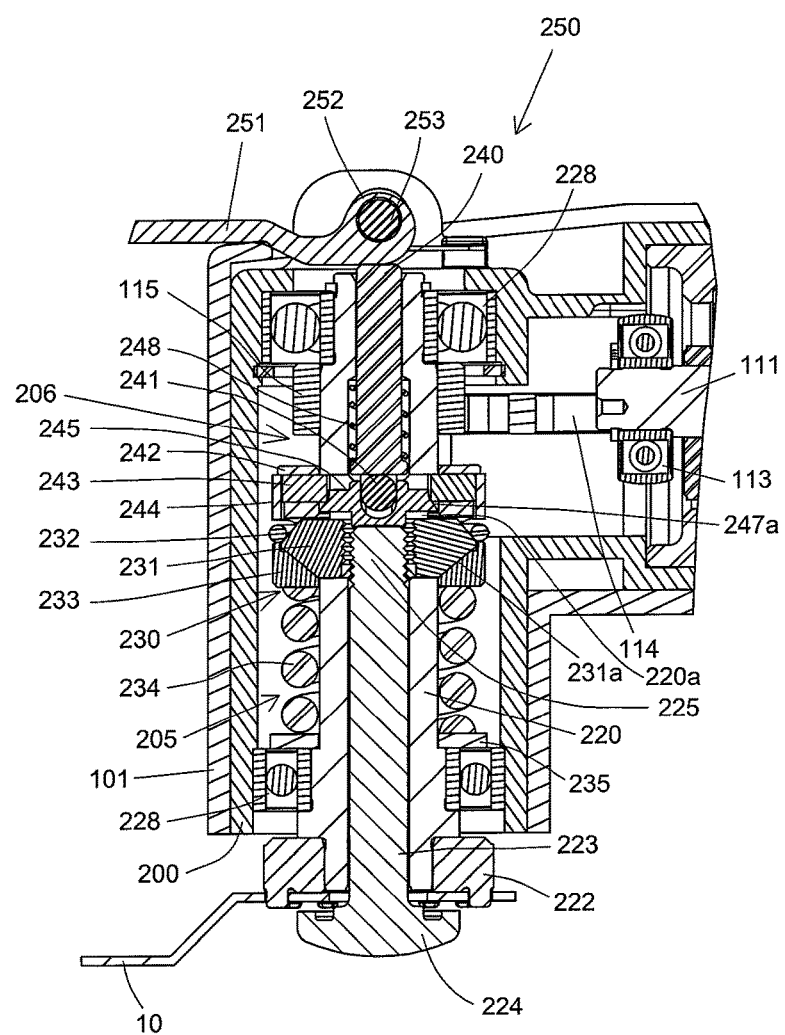
FIG. 20 is a sectional view corresponding to FIG. 15, showing a state in which the cam lever is turned.

In the cam lever 250, as shown in FIG. 15, when the lever part 251 is placed in a position (hereinafter referred to as the clamp position) in which it extends from the pivot shaft 252 toward the motor, the rotating part 253 is not in contact with the thrust pin 240. On the other hand, as shown in FIG. 20, when the lever part 251 is turned against the biasing force of the second coil spring 254 such that the lever part 251 is placed in a position (hereinafter referred to as the release position) in which it extends from the pivot shaft 252 in a direction opposite to the clamp position, the rotating part 253 is in contact with the thrust pin 240. Specifically, along the way of turning the lever part 251 from the clamp position to the release position, the rotating part 253 comes into contact with the thrust pin 240. When the lever part 251 is further turned from this position toward the release position, the rotating part 253 moves the thrust pin 240 downward in the longitudinal direction of the spindle 220. Further, when the cam lever 250 is not held by the user, the cam lever 250 is returned from the release position to the clamp position.

In the tool releasing mechanism 206 configured as described above, when the cam lever 250 is turned from the clamp position toward the release position and the thrust pin 240 is slid downward, a lower end of the thrust pin 240 comes into contact with the engagement pin 241 and the pressing member 245. Thus, the engagement pin 241, the pressing member 245 and the clamp shaft releasing member 242 move downward. At this time, the clamp shaft releasing member 242 moves the clamping member 231 and the annular member 233 downward against the biasing force of the first coil spring 234. After a lower end of the clamping member 231 comes into contact with the spindle 220, the clamp shaft releasing member 242 moves only the annular member 233 downward. As a result, engagement between the inclined surfaces of the annular member 233 and the clamping members 231 can be released. Specifically, the biasing force of the first coil spring 234 is not transmitted to the clamping members 231, so that the biasing force of the first coil spring 234 acting on the clamp shaft 223 can be released. The clamp shaft 223 can be released by reduction of the biasing force for holding the clamp shaft 223. Specifically, the lower end of the pressing member 245 makes contact with an upper end of the clamp shaft 223 and pushes the clamp shaft 233, whereby the clamp shaft 223 moves downward. As a result, the clamp shaft 223 is allowed to be removed from the spindle 220. By removing the clamp shaft 223, the blade 10 can also be removed. The clamp shaft releasing member 242 and the second engagement pins 243 are example embodiments that correspond to the "moving member" according to the present invention.

As shown in FIG. 15, when the cam lever 250 is placed in the clamp position, each of the second engagement pins 243 is held in contact with the outer periphery of the spindle 220. When the cam lever 250 is turned as described above, the cam lever 250 is placed in the release position as shown in FIG. 20. At this time, the clamp shaft releasing member 242 and thus the second engagement pin 243 held by the clamp shaft releasing member 242 move downward, and the second engagement pins 243 engage with the clamping member insert holes 220a of the spindle 220. Specifically, the second engagement pins 243 are inserted into the clamping member insert holes 220a by the biasing force of the C-ring 244 and come into contact with the inclined surface 247a of the pressing member 245. The second engagement pins 243 are biased by the C-ring 244 and come into contact with the clamping member insert holes 220a and the inclined surface 247a, so that the clamp shaft releasing member 242 is prevented from moving upward. As a result, the clamp shaft holding mechanism 230 is prevented from moving upward. Specifically, the electric oscillating tool 1 is kept in a state of being incapable of holding the clamp shaft 223. The C-ring 244 and the second engagement pin 243 are example embodiments that correspond to the "first biasing member" and the "locking member", respectively, according to the present invention.

Further, the cam lever 250 is an example embodiment that corresponds to the "operating member" according to the present invention.

With the structure in which the thrust pin 240 is biased downward by the thrust pin holding spring 248, the cam lever 250 is moved from the release position to the clamp position by the biasing force of the second coil spring 254. Specifically, in the state in which the clamp shaft holding mechanism 230 is prevented from moving upward by engagement of the second engagement pins 243 with the clamping member insert holes 220a, when the user releases the cam lever 250, the cam lever 250 moves to the clamp position by the biasing force of the second coil spring 254. The second coil spring 254 is an example embodiment that corresponds to the "third biasing member" according to the present invention.

In order to mount the blade 10, the blade 10 is fitted onto the clamp shaft 223 and the clamp shaft 223 is inserted into the spindle 220. The clamp shaft 223 is brought into contact with the pressing member 245 by moving the clamp shaft 223 in the longitudinal direction of the spindle 220.

Figure 21:
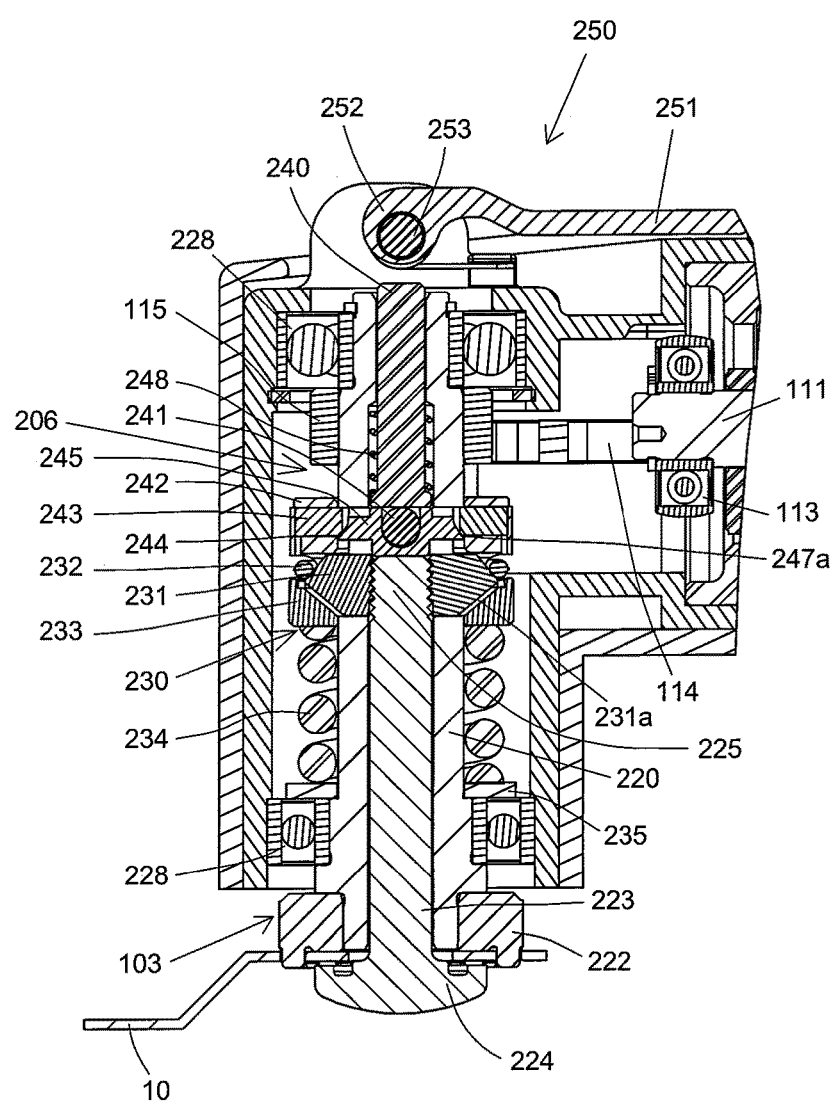
FIG. 21 is a sectional view corresponding to FIG. 15, showing a state in the process of mounting a clamp shaft.

When the clamp shaft 223 is further moved upward, the pressing member 245 moves upward, so that the second engagement pin 243, which is held in contact with the inclined surface 247a, moves outward in a radial direction of the spindle 220 as shown in FIG. 21.

When the clamp shaft 223 is further moved upward, the second engagement pin 243 moves to the outside of the spindle 220, so that the clamp shaft holding mechanism 230 and the clamp shaft releasing member 242 are allowed to move upward. Thus, as shown in FIG. 15, the clamp shaft holding mechanism 230 and the clamp shaft releasing member 242 move upward due to the biasing force of the first coil spring 234 and the inclined surface of the annular member 233 is engaged with the clamping members 231. In this manner, the clamping members 231 clamp the clamp shaft 223. The clamp shaft 223 is thus held in the spindle 220 by the clamping members 231, so that the blade 10 is held between the outer flange 222 and the clamp head 224.

According to the above-described second embodiment, the clamp shaft 223 can be removed to replace the blade 10 simply by turning the cam lever 250. Specifically, the blade 10 can be easily replaced without the need of using a special tool. Further, the clamp shaft 223 can be released when the clamp shaft releasing member 242 is moved by moving the thrust pin 240. Thus, the clamp shaft 223 can be removed simply by moving the cam lever 250 from the clamp position to the release position. Therefore, replacement of the blade 10 can be performed by a simpler operation.

According to the second embodiment, in the state in which removal of the clamp shaft 223 is allowed, the second engagement pins 243 are held in the clamping member insert holes 220a of the spindle 220 by the biasing force of the C-ring 244, so that the clamp shaft releasing member 242 and the clamp shaft holding mechanism 230 are prevented from moving. With such a structure, it is not necessary for the user to operate the cam lever 250 when mounting the clamp shaft 223 and the blade 10. Specifically, the blade 10 can be held by a simple operation.

According to the second embodiment, with the structure in which the clamp shaft 223 disposed inside the spindle 220 can be held by the biasing force of the O-ring 232 or first coil spring 234 which is disposed outside the spindle 220, the spindle 220 can be made thinner. Therefore, the spindle 220 can be reduced in weight and thus the electric oscillating tool 1 can be reduced in weight. Further, due to the weight reduction of the spindle 220 by thinning, the spindle 220 can be driven with a low rotating output. Therefore, the motor 110 can be reduced in size.

According to the second embodiment, with the structure in which the clamp shaft 223 is held by biasing forces of the O-ring 232 and the first coil spring 234, the biasing force required for each of the O-ring 232 and the first coil spring 234 can be appropriately set, so that the degree of freedom in designing the power tool can be increased. Further, with the structure in which the biasing force of the first coil spring 234 acts in parallel to the longitudinal direction of the spindle 220, the electric oscillating tool 1 can be prevented from increasing in size in the radial direction of the spindle 220, as compared with a structure in which the first coil spring 234 expands in the radial direction of the spindle 220 such that the biasing force of the first coil spring 234 directly acts in the radial direction of the spindle 220.

According to the second embodiment, by provision of a simple structure in which the inclined surfaces of the clamping members 231 and the annular member 233 are engaged with each other, the biasing force of the first coil spring 234 acting in parallel to the longitudinal direction of the spindle 220 can be converted into a biasing force acting in the radial direction of the spindle 220. Further, the biasing force of the first coil spring 234 not only holds the clamp shaft 223, but also biases the clamp head 224 of the clamp shaft 223 in a direction toward the outer flange 222 of the spindle 220 in the longitudinal direction of the spindle 220. Specifically, the first coil spring 234 has two functions of holding the clamp shaft 223 and biasing the clamp shaft 223 in the longitudinal direction, so that the part count of the electric oscillating tool 1 can be reduced.

As for a rotating member supported by two bearings, dead space is likely to be formed between the two bearings in the longitudinal direction. According to the second embodiment, therefore, the first coil spring 234 is disposed between the bearings 226, 227 in the longitudinal direction of the spindle 220, so that the dead space can be effectively used. As a result, the electric oscillating tool 1 can be reduced in size.

In the above-described second embodiment, the outer flange 222 is formed separately from the spindle 220 and affixed to the spindle 220, but it may be integrally formed with the spindle 220. Further, the clamp head 224 is integrally formed with the clamp shaft 223, but it may be formed separately from the clamp shaft 223 and affixed to the clamp shaft 223.

In the second embodiment, the O-ring 232 and the first coil spring 234 bias the clamping members 231 in the radial direction of the spindle 220, but the present invention is not limited to this. For example, only one of the O-ring 232 and the first coil spring 234 may bias the clamping member 231 and the other of them may be omitted.

The clamp shaft holding mechanism 230 may not necessarily be provided such that the biasing force of the first coil spring 234 holds the clamp shaft 223. Specifically, it may be provided such that the biasing force of the first coil spring 234 does not hold the clamp shaft 223, but only biases the clamp shaft 223 in a direction in which the clamp head 224 moves toward the outer flange 222.

In the above-described embodiments, the blade 10 is described as the tool accessory, but other types of tool accessories such as a polishing pad may be attached as the tool accessory. Further, in the above-described embodiments, the coil springs 137, 234 are described as the first biasing member, but a disc spring may be used as the first biasing member. In this case, a single disc spring may be used, or a plurality of disc springs may be used in layers. Other types of springs or any other member having a restoring force which is generated by elastic deformation, such as rubber and resin, may be used as the first biasing member.

In the above-described embodiments, the electric oscillating tool 1 is described as a representative example of the power tool, but the present invention is not limited to this. The present invention can also be applied to any other power tool that holds a tool accessory, including power tools in which the tool accessory rotates, such as grinders and a circular saws.

In view of the object of the above-described invention, power tools according the present invention can have the following features.

(Aspect 1)

A power tool, which drives a tool accessory removably held between a first clamp part and a second clamp part, comprising:
 a first shaft having the first clamp part,
 a second shaft having the second clamp part,
 a holding member that fixedly holds the second shaft with respect to the first shaft,
 a moving member that moves the holding member, and
 a first biasing member that biases the moving member, wherein:
 the first shaft and the second shaft are disposed such that their axes extend in parallel to each other and the second shaft is disposed inside the first shaft,
 the holding member is configured to be movable between a first position that is capable of holding the second shaft and a second position that is incapable of holding the second shaft,
 the moving member is configured to move the holding member from the first position to the second position and has a locking member which is biased by the first biasing member, the first biasing member is disposed so as to apply a biasing force in a radial direction of the first shaft, and
 when the holding member is located in the second position and the locking member is biased by the first biasing member and comes into contact with the first shaft, the locking member prevents the moving member from moving in a longitudinal direction of the first shaft.

(Aspect 2)

The power tool as defined in Aspect 1, wherein:
 when the holding member is located in the second position and the second shaft is moved in the longitudinal direction of the first shaft, the second shaft is configured to move the moving member against the biasing force of the first biasing member, and
 the holding member is configured to move from the second position to the first position as the moving member is moved, and to hold the second shaft.

DESCRIPTION OF THE NUMERALS

1 electric oscillating tool (power tool)
10 blade (tool accessory)
100 body housing
101 front housing
102 left housing
102*a* engagement groove
102*b* locking part
103 right housing
103*a* engagement groove
103*b* locking part
104 driving mechanism
105 tool holding mechanism
110 motor
111 output shaft
112 eccentric shaft
113 bearing
114 driven arm
115 spindle connecting part
120 spindle (first shaft)
120*a* small-diameter portion
120*b* large-diameter portion
120*c* ball holding groove (retreat part)
120*d* spring receiving part
121 engagement pin insertion part (engagement recess)
121*a* circumferentially extending part (engagement recess, first recess)
121*b* axially extending part (engagement recess, second recess)
122 outer flange
123 clamp shaft (second shaft)
124 clamp head
125 engagement recess
126 engagement projection (projection)
127 O-ring (elastic member)
130 clamp shaft holding mechanism
131 ball holding member (moving member)
131*a* first portion
131*b* second portion
131*c* cam lever engagement portion
132 ball receiving part
133 engagement pin insert hole
134 recessed groove
135 ball (holding member)
136 engagement pin (engagement projection)
137 first coil spring (first biasing member)
138 retaining member
150 cam lever 151 lever part
152 rotating part
153 first rotating part
153a engagement ring
153b locking projection
154 second rotating part
154a engagement part
155 second coil spring (third biasing member)
200 gear housing
205 tool holding mechanism
206 tool releasing mechanism
220 spindle (first shaft)
220a clamping member insert hole
220b engagement pin insert hole
222 outer flange (first clamp part)
223 clamp shaft (second shaft)
224 clamp head (second clamp part)
225 clamped part
226 bearing
230 clamp shaft holding mechanism
231 clamping member
231a inclined surface
232 O-ring (second biasing member)
233 annular member
234 first coil spring (second biasing member)
235 spring receiving member
240 thrust pin
241 first engagement pin
242 clamp shaft releasing member (moving member)
243 second engagement pin (locking member)
244 C-ring (first biasing member)
245 pressing member
246 central part
246a recess
246b first protrusion
246c second protrusion
247 extending part
247a inclined surface
248 thrust pin holding spring
250 cam lever
251 lever part
252 pivot shaft
253 rotating part
254 second coil spring (third biasing member)

The invention claimed is:

1. A power tool configured to drive a tool accessary removably held between a first clamp part and a second clamp part, comprising:
a first shaft having the first clamp part,
a second shaft configured to move the second clamp part,
a holding member for the second shaft, the holding member being configured to be movable relative to the second shaft,
a moving member configured to move the holding member, and
a biasing member biasing the moving member,
wherein:
the first shaft and the second shaft are disposed such that their axes extend in parallel to each other and the second shaft is disposed inside the first shaft,
the holding member is configured to be movable between a first position and a second position, relative to the second shaft, the holding member enabling the second clamp part of the second shaft and the first clamp part to hold the tool accessary therebetween in the first position, and the holding member disabling the second clamp part and the first clamp part to hold the tool accessary therebetween in the second position,
the moving member is configured to move the holding member from the first position to the second position,
the biasing member is configured to bias the moving member when the holding member is located in the second position, and thereby prevent movement of the moving member, and
the biasing member is configured to engage the moving member with a recess inclined to an axial direction of the second shaft and thereby prevent movement of the moving member.

2. The power tool according to claim 1, wherein the biasing member is also configured to bias the moving member when the holding member is located in the first position, and thereby prevent movement of the moving member.

3. The power tool according to claim 1, wherein the second clamp part is configured such that pressing the second clamp part toward the biasing member when the holding member is in the second position causes the biasing member to shift the holding member to the first position.

4. The power tool according to claim 1, wherein the biasing member comprises a compression spring.

5. The power tool according to claim 1, wherein the moving member is configured to turn the holding member around an axis of rotation.

6. The power tool according to claim 1, wherein the recess includes a convex wall portion.

7. The power tool according to claim 6, wherein:
the biasing member comprises a compression spring,
the compression spring is also configured to bias the moving member when the holding member is located in the first position, and
the second clamp part is configured such that pressing the second clamp part toward the compression spring when the holding member is in the second position causes the compression spring to shift the holding member to the first position.

8. A power tool configured to drive a tool accessary removably held between a first clamp part and a second clamp part, comprising:
a first shaft having the first clamp part,
a second shaft configured to move the second clamp part,
a holder associated with the second shaft and mounted for movement relative to the second shaft,
an impeller configured to move the holder, and
a spring biasing the impeller,
wherein:
the first shaft and the second shaft are disposed such that their axes extend in parallel to each other and the second shaft is disposed inside the first shaft,
the holder is movable between a first position and a second position relative to the second shaft, the holder in the first position locking the tool accessory to the first shaft and the holder in the second position unlocking the tool accessory from the first shaft,
the impeller is configured to move the holder from the first position to the second position,
the spring is configured to bias the impeller to hold the holder in the second position, and
the impeller is configured to turn the holder around an axis of rotation.

9. The power tool according to claim 8, wherein the spring is also configured to bias the impeller to hold the holder in the first position.

10. The power tool according to claim 8, wherein the second clamp part is configured such that pressing the second clamp part toward the spring when the holder is in the second position causes the spring to shift the holder to the first position.

11. The power tool according to claim 8, wherein the spring is configured to engage the moving member with a recess inclined to an axial direction of the second shaft.

12. The power tool according to claim 11, wherein the recess includes a convex wall portion.

13. The power tool according to claim 12, wherein:
the spring is also configured to bias the impeller to hold the holder in the first position, and
the second clamp part is configured such that pressing the second clamp part toward the spring when the holder is in the second position causes the spring to shift the holder to the first position.

14. A power tool configured to drive a tool accessary removably held between a first clamp part and a second clamp part, comprising:
a first shaft having the first clamp part,
a second shaft configured to move the second clamp part,
a holder associated with the second shaft and mounted for movement relative to the second shaft,
a moving member configured to move the holder, and
a spring configured to hold the holder in a first position and to hold the holder in a second position,
wherein:
the first shaft and the second shaft are disposed such that their axes extend in parallel to each other and the second shaft is disposed inside the first shaft,
the holder is movable between the first position and the second position relative to the second shaft,
the moving member is configured to move the holder from the first position to the second position, and
the second clamp part is configured such that pressing the second clamp part toward the spring when the holder is in the second position causes the spring to shift the holder to the first position.

15. The power tool according to claim 14, wherein when the holder is in the first position the holder locks the tool accessory to the first shaft and when the holder is in the second position the holder unlocks the tool accessory from the first shaft.

16. The power tool according to claim 14, wherein the spring is configured to engage the moving member with a recess inclined to an axial direction of the second shaft.

17. The power tool according to claim 16, wherein the recess includes a convex wall portion.

18. The power tool according to claim 14, wherein the moving member is configured to turn the holder around an axis of rotation.

19. The power tool according to claim 14, wherein:
the spring is configured to bias the moving member when the holder is located in the first position, and thereby prevent movement of the moving member; and
the spring is configured to bias the moving member when the holder is located in the second position, and thereby prevent movement of the moving member.

20. The power tool according to claim 19, wherein the moving member is configured to turn the holder around an axis of rotation.

* * * * *